US011899153B2

(12) United States Patent
Liu et al.

(10) Patent No.: US 11,899,153 B2
(45) Date of Patent: Feb. 13, 2024

(54) GUIDED MODE BEAMFORMING FOR PROBING OPEN-HOLE AND CASED-HOLE WELL ENVIRONMENTS

(71) Applicant: Schlumberger Technology Corporation, Sugar Land, TX (US)

(72) Inventors: Yang Liu, Cambridge, MA (US); Ralph D'Angelo, North Weymouth, MA (US); Smaine Zeroug, Lexington, MA (US); Sandip Bose, Brookline, MA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 18/065,694

(22) Filed: Dec. 14, 2022

(65) Prior Publication Data

US 2023/0110473 A1 Apr. 13, 2023

Related U.S. Application Data

(62) Division of application No. 16/495,408, filed as application No. PCT/US2018/024247 on Mar. 26, 2018, now Pat. No. 11,531,132.
(Continued)

(51) Int. Cl.
*G01V 1/44* (2006.01)
*E21B 47/14* (2006.01)
(Continued)

(52) U.S. Cl.
CPC ............... *G01V 1/44* (2013.01); *E21B 47/00* (2013.01); *E21B 47/005* (2020.05); *E21B 47/14* (2013.01); *E21B 49/00* (2013.01)

(58) Field of Classification Search
CPC ......... G01V 1/44; E21B 47/00; E21B 47/005; E21B 47/14; E21B 49/00
See application file for complete search history.

(56) References Cited

U.S. PATENT DOCUMENTS 3,860,759 A 1/1975 Miller
4,592,031 A 5/1986 Bradshaw
(Continued)

FOREIGN PATENT DOCUMENTS

WO 2015200457 A1 12/2015
WO 2016187239 A1 11/2016
WO 2017123150 A1 7/2017

OTHER PUBLICATIONS

Zeroug, S. et al., "Sonic and ultrasonic measurement applications fort cased oil wells", Insight, 2016, 58(8), pp. 423-430.
(Continued)

*Primary Examiner* — Ian J Lobo
(74) *Attorney, Agent, or Firm* — Jeffrey D. Frantz

(57) ABSTRACT

A downhole tool including at least one transmitter, a receiver array, and a controller. Each receiver element of the receiver array is configured to apply variable amplification and a variable time delay to detected acoustic waveforms, wherein the variable amplification is controlled by an amplification factor assigned to the given receiver element, and wherein the variable time delay is controlled by a time delay assigned to the given receiver element. The controller assigns a set of amplification factors and time delays to the receiver elements of the receiver array and combines signals resulting from the application of the variable amplification and the variable time delay to the detected acoustic waveforms such that sensitivity of the receiver elements of the receiver array is focused at a desired zone-of-interest in a wellbore corre-
(Continued)

sponding to the set of amplification factors and time delays assigned to the receiver elements of the receiver array.

6 Claims, 15 Drawing Sheets

Related U.S. Application Data

(60) Provisional application No. 62/476,696, filed on Mar. 24, 2017.

(51) Int. Cl.
*E21B 49/00* (2006.01)
*E21B 47/005* (2012.01)
*E21B 47/00* (2012.01)

(56) References Cited

U.S. PATENT DOCUMENTS

| | | | |
|---|---|---|---|
| 5,383,114 | A | 1/1995 | Chambers |
| 7,771,356 | B2 | 8/2010 | Voie |
| 10,191,173 | B2 * | 1/2019 | Thierry ............ G01V 1/50 |
| 2006/0175057 | A1 | 8/2006 | Mandal |
| 2012/0120767 | A1 | 5/2012 | Vu |
| 2013/0258809 | A1 | 10/2013 | Cotton |
| 2015/0198732 | A1 | 7/2015 | Zeroug |
| 2015/0268367 | A1 | 9/2015 | Khajeh |
| 2015/0377016 | A1 | 12/2015 | Ahmad |
| 2016/0216393 | A1 | 7/2016 | Zhou |
| 2020/0049850 | A1 | 2/2020 | Liu |

OTHER PUBLICATIONS

Zeroug, S. et al., "Ultrasonic leaky-lamb wave imaging through a highly contrasting layer," 2003 IEEE Symposium on Ultrasonics, 2003, 1, pp. 794-798.

Van Kuijk, R. et al., "A Novel Ultrasonic Cased-Hole Imager for Enhanced Cement Evaluation", IPTC 10546, presented at the International Petroleum Technolgy Conference, Doha, Qatar, 2005, 14 pages.

Arroyo France, J. L. et al., "Sonic Investigations In and Around the Borehole," Schlumberger Oilfield Review, Spring 2006, pp. 14-33.

Haldorsen, J. B. U. et al., "Borehole Acoustic Waves," Haldorsen et al.; Schlumberger Oilfield Review, pp. 34-43, (Spring 2006).

Sinha, B. K. et al., "Dispersion and radial depth of investigation of borehole modes", Geophysical Prospecting, 2004, 52(4), pp. 271-286.

Pistre, V. et al., "A Modular Wireline Sonic Tool for Measurements of 3D (Azimuthal, Radial, and Axial) Formation Acoustic Properties", presented at the SPWLA 46th Annual Logging Symposium, New Orleans, Louisiana, U.S.A., 2005, pp. 13 pages.

Liu, Y. et al., "Theoretical and experimental investigations of acoustic waves in embedded fluid-solid multi-string structures", Applied Physics Letters, 2017, 110, 101906, 5 pages.

Lu, C.-C. et al., "A three-dimensional dyadic Greens function for elastic waves in multilayer cylindrical structures", Journal of Acoustical Society of America, 1995, 98(5), pp. 2825-2835.

International Search Report and Written Opinion of International Patent Application No. PCT/US2018/024247 dated Jul. 4, 2018, 15 pages.

International Preliminary Report on Patentability of International Patent Application No. PCT/US2018/024247 dated Oct. 3, 2019, 12 pages.

Examination Report issued in GB Application 1915446.7, dated Sep. 16, 2021 (3 pages).

* cited by examiner

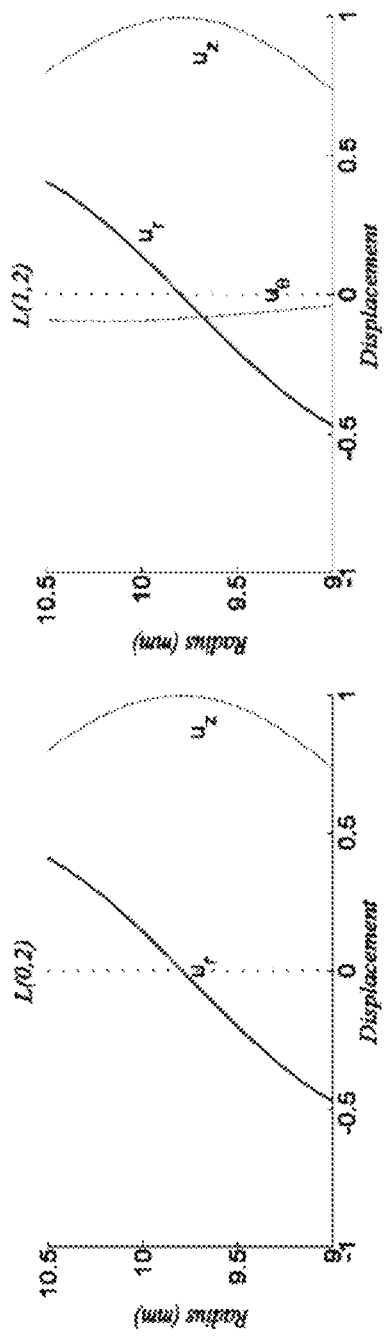
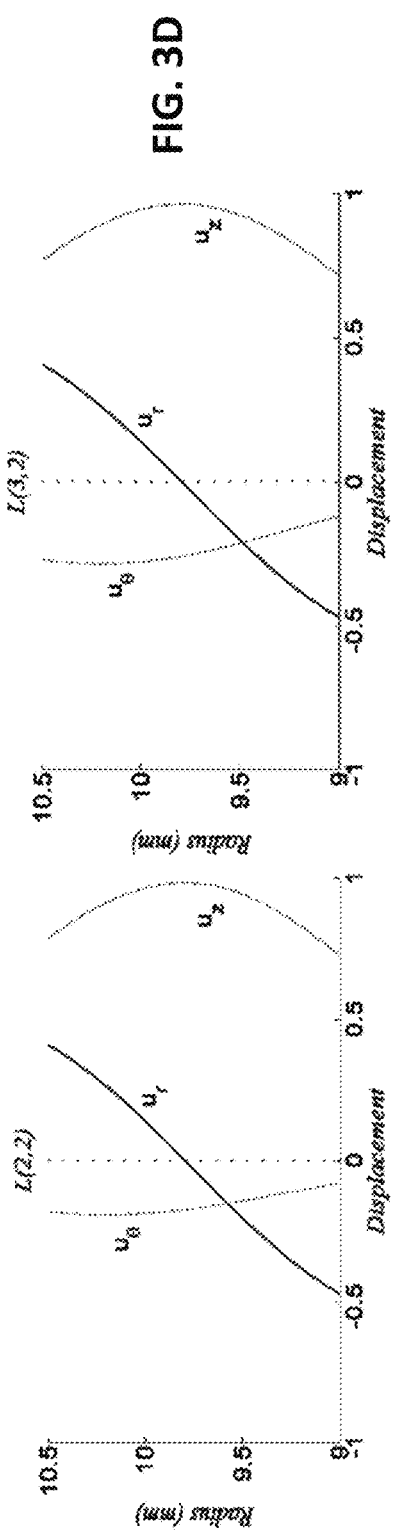
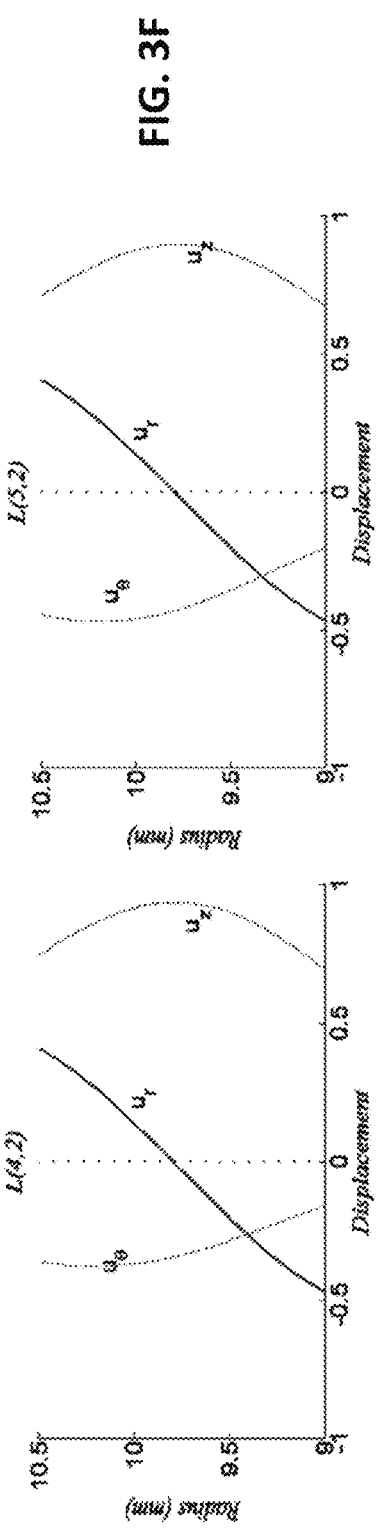
FIG. 3A
FIG. 3B
FIG. 3C
FIG. 3D
FIG. 3E
FIG. 3F

GUIDED MODE BEAMFORMING FOR PROBING OPEN-HOLE AND CASED-HOLE WELL ENVIRONMENTS

CROSS-REFERENCE TO RELATED APPLICATIONS

The present document is a Divisional of U.S. patent application Ser. No. 16/495,408, filed Sep. 19, 2019, which is the National Stage Entry of PCT/US2018/024247, filed Mar. 26, 2018, which is based on and claims priority to U.S. Provisional Application Ser. No. 62/476,696, filed Mar. 24, 2017, all of which are incorporated herein by reference in their entirety.

BACKGROUND

1. Technical Field

The subject disclosure relates to acoustic apparatus, methods and systems for characterizing rock formations and completions in wellbores.

2. Related Art

Interrogating rock formations in open or cased oil and gas wells with acoustics is routinely conducted with a variety of downhole measurement tools. The data acquired with these measurements provide the means to estimate formation mechanical, geophysical and petrophysical properties in open-holes and cased-holes. In cased-holes, the measurement data also allow for characterization of the cement sheath behind a casing string. See, e.g., S. Zeroug, et al., "Sonic and ultrasonic measurement applications fort cased oil wells," Insight, vol. 58(8), August, 2016, pp. 423-430; S. Zeroug and B. Froelich, "Ultrasonic leaky-lamb wave imaging through a highly contrasting layer," 2003 IEEE Symposium on Ultrasonics, Vol. 1. (2003), pp. 794-798; and R. van Kuijk, et al., "A Novel Ultrasonic Cased-Hole Imager for Enhanced Cement Evaluation," International Petroleum Technology Conference (IPTC), 21-23 Sep. 2005, Doha, Qatar. (2005). Two types of measurement embodiments can be distinguished: (i) the sonic type where signals of frequencies ranging from a few hundreds of Hertz to 25 kHz are employed to excite wellbore cylindrical modes either in open or cased-hole configurations (see, e.g., Arroye, France et al., "Sonic Investigations In and Around the Borehole", Schlumberger Oilfield Review, Spring 2006 pp. 14-33; and Haldorsen et al., "Borehole Acoustic Waves", Schlumberger Oilfield Review, Spring 2006, pp. 34-43; and (ii) the ultrasonic type where signals of frequencies ranging from 50 kHz to several hundreds of kHz are used to localize acoustic energy and image specific spatial regions mostly in cased-hole configurations for cement sheath evaluation, but also for wellbore wall imaging (see, e.g., the previously cited publications to S. Zeroug, et al., and S. Zeroug and B. Froelich).

An advantage of the low-frequency sonic measurement is the ability to probe radially deep into the formation (e.g., about three to five wellbore diameters in an open-hole configuration) or through multiple casing strings. See, Sinha, B. K. and Asvadurov, S., "Dispersion and radial depth of investigation of borehole modes", Geophysical Prospecting, vol. 52, 2004, pp. 271-286, and US Patent Publ. No. 2015/0198732 to Sinha, B. K. et al., entitled "Sonic logging for well integrity." However, this is achieved at the expense of poor azimuthal resolution as the acoustic energy tends to fill in the space at all azimuths. The reverse is true for the high-frequency ultrasonic measurement where high azimuthal resolution is achieved but with limited radial probing—a few inches into the rock in an open-hole and not beyond the rock face in a cased-hole.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

The present disclosure is directed to an acoustic logging tool apparatus, and related methods and systems that provide for relatively deep radial probing with relatively high azimuthal resolution.

In embodiments, the acoustic logging tool includes an array of transmitter elements (transmitter array) which are spaced around the outer circumference of the tool at different azimuthal angles at a common axial location along the central tool axis. Each transmitter element (which is also referred to herein as a "transducer" or a "source channel" or "channel") is individually controllable in terms of the amplitude of a borehole guided mode acoustic signal that is emitted by the transmitter element as well as its excitation initiation time, which allows for control of variable time delay between the excitation initiation times of the transmitter elements and thus the phase of the borehole guided mode acoustic signals that are emitted by the transmitter elements. Specific amplitude controls (or factors or weights) and time delays can be dynamically applied to the transmitter elements. By properly adjusting the amplitude controls and time delays for the transmitter elements of the transmitter array, a composite borehole guided mode (which is referred to as a focused acoustic beam) that results from the combination of the borehole guided mode acoustic signals emitted by the array of transmitter elements can be steered and focused to probe a desired zone in the borehole environment. Such control can be configured for deep probing with high azimuthal resolution by the steering and focusing of the wellbore acoustic energy azimuthally, axially, and radially.

In one embodiment, azimuthal localization of the focused acoustic beam can be achieved without sacrificing deep probing by configuring the transmitter elements of the transmitter array to emit borehole guided mode acoustic signals with a narrow-bandwidth in the ultrasonic frequency range.

The acoustic logging tool can also include an array of receiver elements (receiver array) which are spaced around the outer circumference of the tool at different azimuthal angles at a common axial location along the central tool axis. The common axial location of the array of receiver elements is spaced apart from (preferably up or above) the common axial location of the array of transmitter elements along the central tool axis. The array of receiver elements can be configured to detect acoustic waveforms (signals) resulting from the interaction of the focused acoustic beam generated by array of transmitter elements with the borehole environment.

In embodiments, the transmitter elements of the transmitter array generate a steered and focused acoustic beam through control of the excitation initiation time and amplitude of borehole guided mode acoustic signals emitted by the transmitter elements. The experiment can be repeated with different excitation initiation time controls (time delays) and amplitude controls applied to the transmitter elements of the transmitter array to scan the acoustic energy through an area of interest in the borehole environment. By properly adjusting the time delays and amplitude control among the transmitter elements of the transmitter array, the focused acoustic beam can be steered and focused dynamically without requiring mechanical scanning (rotation) of the acoustic logging tool.

In embodiments, each receiver element of the receiver array can be individually controllable in terms of an amplification factor and a time delay that are applied to acoustic waveforms that are detected by the receiver element. The acoustic waveforms are electrical signals representing acoustic energy received by the receiver element. The application of the time delay allows for control of variable time delay between the acoustic waveforms that are detected by the receiver elements and thus the phase of the acoustic waveforms that are detected by the receiver elements. Specific amplification factors (or weights) and time delays can be dynamically applied to the receiver elements of the receiver array. By properly adjusting the amplification factors and time delays for the receiver elements of the receiver array and combining the resulting signals for all of the receiver elements of the receiver array, the sensitivity of the receiver elements of the receiver array can be steered and focused to probe a desired zone in the borehole environment. Such control can be configured for deep probing with high azimuthal resolution by steering and focusing the sensitivity of the receiver elements of the receiver array azimuthally, axially, and radially. In such embodiments, the transmitter elements of the transmitter array can be configured to emit a focused acoustic beam in the same (or overlapping) zone in the borehole environment that is probed by the steered and focused sensitivity of the receiver elements of the receiver array. However, such beam focusing operations by the transmitter elements of the transmitter array is not required and one or more other transmitter configurations (such as a monopole source, dipole source or quadropole source) can be incorporated and used by the acoustic logging tool provided that such transmitter configuration(s) produce the desired borehole guided acoustic mode signal that reaches and interacts with the desired zone in the borehole environment that is probed by the steered and focused senstivity of the receiver elements of the receiver array.

In embodiments, the experiment employing the steered and focused sensitivity of the receiver elements of the receiver array can be repeated with different time delays and amplification factors applied to the receiver elements of the receiver array to scan the sensitivity of the receiver elements of the receiver array through an area of interest in the borehole environment. By properly adjusting the time delays and amplification factors among the receiver elements of the receiver array and combining the resulting signals for all of the receiver elements of the receiver array, the sensitivity of the receiver elements of the receiver array can be steered and focused dynamically without requiring mechanical scanning (rotation) of the acoustic logging tool.

The acoustic waveforms that are received by the receiver elements(s) of the receiver array from any or all experiments may be processed in order to obtain information regarding the borehole environment. For example, in open-hole environments, the acoustic waveforms may be processed to provide imaging of varying velocity distributions around the borehole at high azimthual resolution. Such images can be useful to detect non-uniform stress concentration around the borehole. Likewise, the acoustic waveforms may be processed to provide images of a network of preferentially aligned fractures. In cased-hole environments, the acoustic waveforms may be processed to determine characteristics of cement in the borehole environment and evaluate the integrity of such cement. More specifically, accurate evaluation of the cement can require azimuthal resolution to detect azimuthally-localized flaws that may arise from the azimuthally non-symmetric process of cement placement and cement distribution that takes place between a rock formation and a casing (that is typically centered within the hole). The same is also true for a well cased with multiple casing strings where the interest may be in interrogating with acoustics the multiple annuli for complete cement fill or placement. Other applications that may utilize azimuthal localization of the acoustic energy include (i) acoustic imaging of bed boundaries situated away from the well trajectory and (ii) the use of the focused energy beam for inducing non-linear interaction in the rock formation. Such nonlinear characterization requires high amplitude ultrasonic excitation, which can be achieved through the acoustic phased array focusing as described herein.

Additional aspects, embodiments, objects and advantages of the disclosed methods may be understood with reference to the following detailed description taken in conjunction with the provided drawings.

BRIEF DESCRIPTION OF THE DRAWINGS

FIGS. 3A-3F show modal displacement plots for a radial energy distribution study of various borehole guided modes at 115 kHz.

DETAILED DESCRIPTION

Figure 1A:
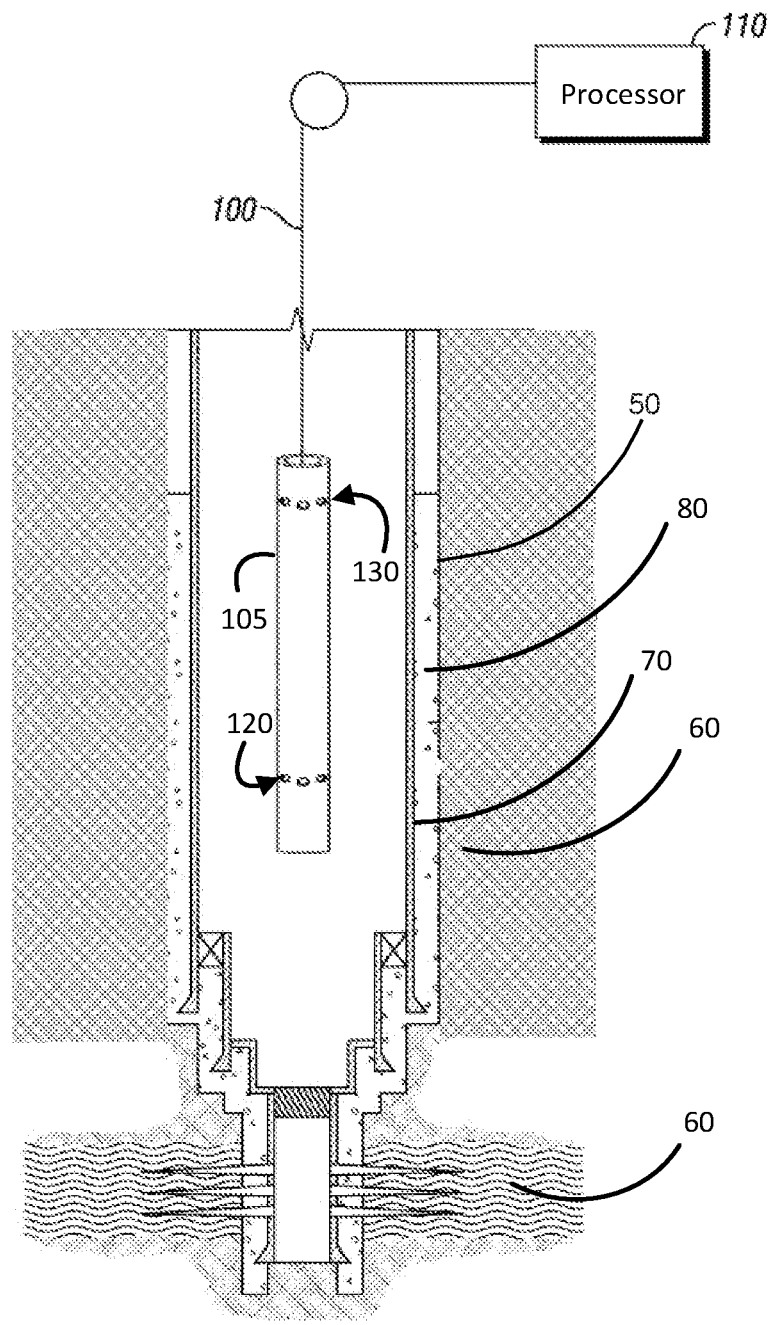
FIG. 1A is a schematic illustration of an acoustic logging tool and system in accordance with embodiments of the present disclosure.

The present disclosure is directed to an apparatus, method and system that utilizes beamforming of acoustic energy radiated within a wellbore at prescribed confined regions of the surrounding borehole environment (which is also referred to as a "wellbore" herein).

As will be described in more detail hereinafter, according to one embodiment, an acoustic logging tool includes a tool body that supports an array of transmitter elements (transmitter array) and an array of receiver elements (receiver array). The transmitter elements of the transmitter array are spaced around the outer circumference of the tool body at different azimuthal angles at a common axial location along the central tool axis. The receiver elements of the receiver array are spaced around the outer circumference of the tool body at different azimuthal angles at a common axial location along the central tool axis. The axial location of the receiver array is spaced apart from (preferably up or above) the axial location of the transmitter array along the central tool axis. The tool body can also house a controller for causing controlled excitation of the transmitters elements. Alternatively, the controller can be external the tool body at the surface. The controller provides for individual control of each transmitter element of the array in terms of the amplitude of a borehole guided mode acoustic signal that is emitted by the transmitter element as well as its excitation initiation time, which allows for control of variable time delay between the excitation initiation times of the transmitter elements and thus the phase of the borehole guided mode acoustic signals that are emitted by the transmitter elements. By properly adjusting the amplitude controls (e.g., factors or weights) and the excitation initiation time (or time delays) for the transmitter elements of the array, a composite guided mode (which can be referred to as a focused acoustic beam) is formed by combination of the borehole guided mode signals emitted by the array of transmitter elements through constructive interference and steered to probe a desired zone in the borehole environment.

In embodiments, the desired zone in the borehole environment can be located within the full 360 degree azimthual range around the tool body and within a range of axial positions along the length of the tool body. The location of the desired zone within such azimthual range and such axial range is dictated by the amplitude controls (e.g., factors or weights) and the excitation initiation time (or time delays) dynamically assigned to the transmitter elements of the array. Such control can be configured for deep probing with high azimuthal resolution by the focusing of the wellbore acoustic energy azimuthally, axially, and radially.

In embodiments, the focused acoustic beam combines (through constructive interference) and localizes the acoustic energy of the borehole guided mode signals emitted by the array of transmitter elements such that maximal (or peak) acoustic energy occurs in the desired zone in the borehole environment. For example, the focused acoustic beam can have a primary lobe with a peak acoustic energy that occurs at or near the desired zone, where such peak acoustic energy is greater than the maximum energy of secondary lobes of the acoustic beam that occur outside the desired zone.

The array of receiver elements of the acoustic logging tool can be configured to detect acoustic waveforms resulting from the interaction of the focused acoustic beam with the borehole environment. The detected waveforms that are received by the receiver elements of the array may be processed in order to obtain information regarding the borehole environment.

The experiment can be repeated by dynamically assigning different excitation initiation time controls (time delays) and amplitude controls (factors or weights) to the transmitter elements of the array such that the focused acoustic beam scans through a desired area of interest in the borehole environment. By properly adjusting the excitation initiation time controls (time delays) and amplitude controls (factors or weights) for the transmitter elements of the array, the focused acoustic beam can be steered and focused dynamically over an area of interest in the borehole environment without requiring mechanical scanning (rotation) of the acoustic logging tool.

In embodiments, each receiver element can be individually controllable in terms of an amplification factor and time delay applied to acoustic waveforms that are detected by the receiver element. The control of time delay allows for control of variable time delay between the acoustic waveforms that are detected by the receiver elements and thus the phase of the acoustic waveforms that are received by the receiver elements. Specific amplification controls (or factors or weights) and time delays can be dynamically applied to the receiver elements of the receiver array. By properly adjusting the amplification controls and time delays for the receiver elements of the receiver array and combining the resulting signals for all of the receiver elements of the receiver array, the sensitivity of the receiver elements can be steered and focused to probe a desired zone in the borehole environment. Such control can be configured for deep probing with high azimuthal resolution by the steering and focusing of the sensitivity of the receiver elements azimuthally and axially. In such embodiments, the transmitter elements can be configured to emit a focused acoustic beam in the same (or overlapping) zone in the borehole environment that is probed by the steered and focused sensitivity of the receiver elements. However, such beam focusing operations by the transmitter elements is not required and another transmitter configuration (such as a monopole source, dipole source or quadropole source) can be incorporated and used by the acoustic logging tool provided that such transmitter configuration produces the desired borehole guided acoustic mode signal that reaches and interacts with the desired zone in the borehole environment that is probed by the steered and focused sensitivity of the receiver elements of the receiver array.

In embodiments, the experiment employing the steered and focused sensitivity of the receiver elements can be repeated with different time delays and amplification controls applied to the receiver elements of the receiver array to scan the sensitivity of the receiver elements through an area of interest in the borehole environment. By properly adjusting the time delays and amplification controls among the receiver elements of the receiver array, the sensitivity of the receiver elements can be steered and focused dynamically without requiring mechanical scanning (rotation) of the acoustic logging tool.

The borehole environment can include an open-hole geometry, in which case, the apparatus, method and system can be used to (i) localize the focused acoustic beam and/or focus the sensitivity of the receiver elements at a specific axial, azimuthal and radial zone within the rock formation for imaging purposes, or (ii) apply the focused acoustic beam/or focus the sensitivity of the receiver elements at a specific axial, azimuthal and radial zone within the rock formation to generate and measure non-linear interaction with the rock.

Alternatively, the borehole environment can include a cased-hole geometry (e.g. a wellbore with a completion), in which case, the acoustic energy interacts with a more complex cylindrically-layered fluid-elastic structure made of one or more (i) concentric steel casings, (ii) one or more corresponding annuli containing cement sheath or fluid, and (iii) a rock formation. The cased-hole may include potential defects in the cemented annular region. The apparatus, method and system can accordingly be used in the cased-hole geometry to localize the focused acoustic beam and/or focus the sensitivity of the receiver elements of the receiver array to interrogate specific regions of the structure for structural specifics such as (i) interfacial debonding between cement and casing or cement and formation or (ii) bulk defects within the cement sheath (e.g., cracking or voids).

Note that when an acoustic wave propagates along an open/cased wellbore geometry, complex constructive and destructive interferences occur that lead to the generation of numerous borehole guided mode signals in the cylindrically-layered fluid-elastic structures. These borehole guided mode signals are dispersive in nature and their acoustic energy distribute uniquely along the radial and azimuthal directions of the borehole environment. Analytical and numerical methods can be employed to understand the modal dispersive properties and energy spatial distributions. Such an understanding can be leveraged for selective mode excitation and detection to address the objective of localizing the modal energy/or focus the sensitivity of the receiver elements at particular azimuthal range, axial position, and radial layer.

According to one aspect, generating the focused acoustic beam and/or focusing the sensitivity of the receiver elements of the receiver array in a wellbore for the purpose of investigating a desired zone of the borehole environment may use an analysis of wave propagation in the borehole environment being considered. Such analysis can employ modal dispersion signatures and modal energy distributions in the form of particle displacement plots across the radial and azimuthal directions of the three components (radial, azimuthal, and axial) of wave particle displacement within the borehole environment. Given a particular configuration and particular purpose, modal sensitivity and excitability studies may then be conducted to identify and select one or more borehole guided modes that can be used to interrogate the borehole environment and have the most bearing on the objective pursued. In some embodiments, such analysis can be used to identify and select one or more borehole guided modes that are most sensitive to changes in the material properties of the region of interest in the borehole environment. For example, probing cement imperfections at a particular annulus requires consideration of modal dispersions and energy distributions that are most affected by the presence of such imperfections. As another example, amplifying acoustic energy within the rock formation at a particular distance away from a cased-hole wellbore requires consideration of modal dispersions and energy distributions that yield the largest modal amplitude at the specific region and that, additionally, are not impeded by imperfections of the cement sheath (e.g., whether within the bulk of the cement sheath or at the interfacial bonds with casing and formation).

In embodiments, the selection of one or more borehole guided modes can be implemented with an acoustic logging tool designed and fabricated with multi-element phased array transmitters, multi-element phased array receiver elements, and a processor. In one embodiment, the array of transmitters and the array of receivers can be configured in a pitch-catch mode, where energy of the focused acoustic beam generated by the array of transmitters occurs at or near the desired zone in the borehole environment and then propagates through the borehole environment where it is sensed by the array of receivers. The energy of the focused acoustic beam interacts with the borehole environment as it propagates through the borehole environment. Such interaction can induce reflection, attenuation, and dispersion of the energy of the focused acoustic beam as it propagates through the borehole environment. In one embodiment, the receivers may be identical in characteristics to the transmitters. Regardless, features of the received signals such as estimated reflection coefficients, attenuation, and spectral content can be used to provide quantitative answers with regard to the borehole environment as discussed in more detail below.

Turning to FIG. 1A, an acoustic logging tool is shown located in a plugged-in cased well 50 traversing a formation 60. The acoustic logging tool includes a cylindrical tool body 105 suspended on a wireline cable 100 and in communication with a processor 110. The well 50 is shown to be cased with a casing 70 surrounded by an annulus of cement 80 between the casing 70 and the formation 60 along a length of the cased well 50. A winch or other deployment device (not shown) can be controlled to lower or raise the wireline cable 100 from a rig, platform or other surface structure (not shown). A liquid fluid, such as drilling mud or other borehole fluid, can fill the well 50 such that it occupies the space between the acoustic logging tool and the local borehole environment adjacent the tool (i.e., the casing 70, the annulus of cement 80, and the formation 60 in the cased-hole geometry shown or the formation in an open-hole geometry). The acoustic logging tool may be configured for data acquisition where the tool is advanced to a desired depth in the well 50 and operated to emit acoustic signals that interact with the local borehole environment adjacent the tool (such as the casing 70, the annulus of cement 80, and the formation 60) to estimate characteristics of the local borehole environment. The well 50 may be a vertical well as shown, but is not limited thereto. For example, the well or portions thereof can be vertical, deviated, horizontal and can have any selected path that traverses through the formation 60.

Figure 1B:
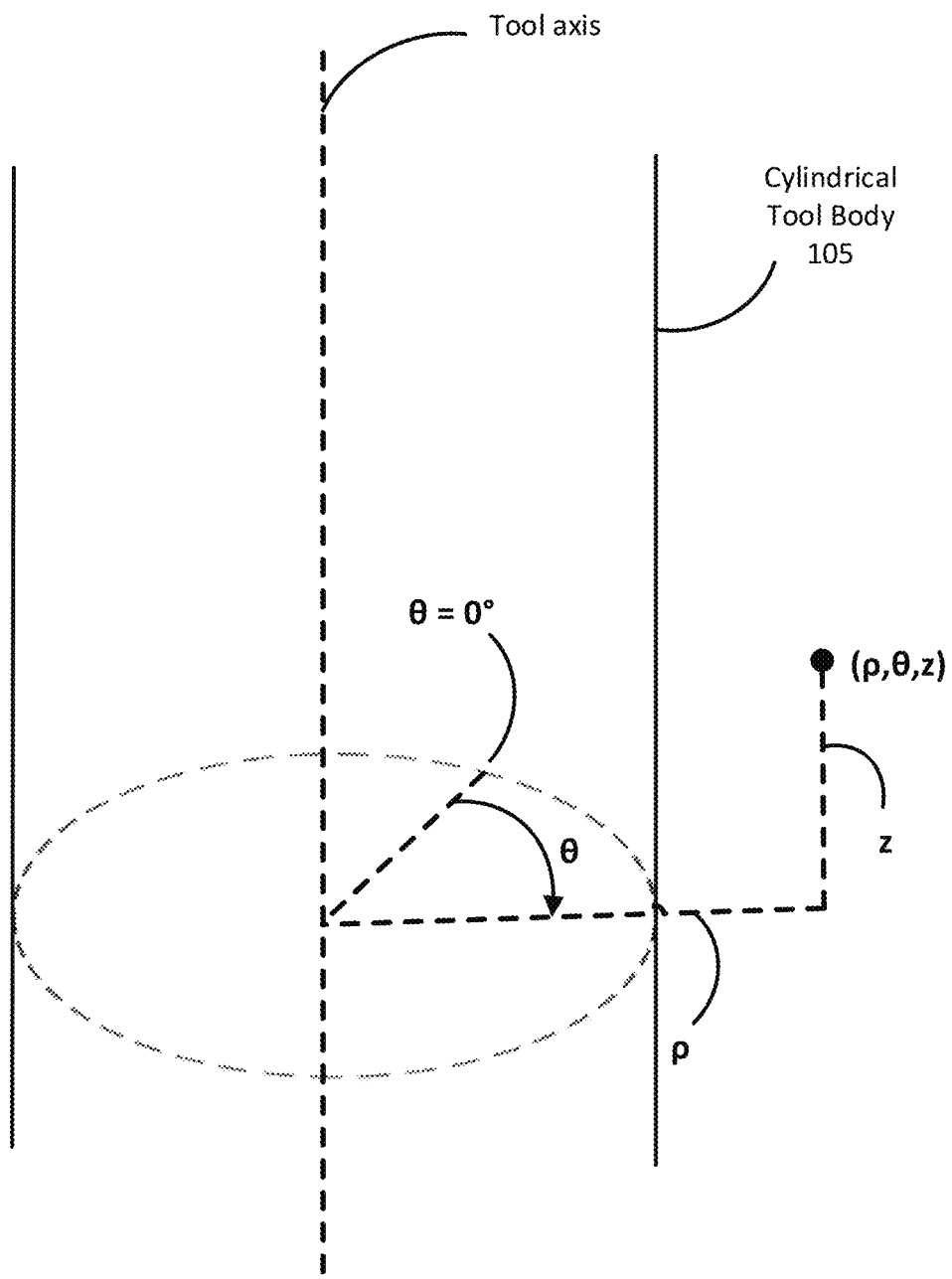
FIG. 1B is schematic illustration of a cylindrical coordinate system which can be used to describe the three-dimensional configuration of the acoustic logging tool and the three-dimensional space of the borehole environment.

The three-dimensional configuration of the acoustic logging tool and the three-dimensional space of the borehole environment can be described by a cylindrical coordinate system as shown in FIG. 1B. The cylindrical tool body 105 defines a central tool axis that extends along the length of the tool body 105. A reference plane is perpendicular to the central tool axis with a polar axis that defines a ray lying in the reference plane at a predefined 0° azimuthal angle. Position in the cylindrical coordinate system is specified by a radial distance p from the central tool axis, an azimthual direction or angle θ in the reference plane relative to the polar axis, and a distance z from the reference plane (which is shown as a direction parallel to the central tool axis).

Referring back to FIG. 1A, the tool body 105 supports an array of transmitter elements 120 that are spaced around the outer circumference of tool body 105 at different azimuthal angles θ (in a ring configuration) at a common axial location (e.g., $z_t$) along the tool axis as shown. For example, the array of transmitter elements 120 can include a ring of eight transmitter elements spaced at forty-five degree intervals of azimuth, or a ring of sixteen transmitter elements spaced at twenty-two and a half degree intervals of azimuth, or possibly a ring of a different number of transmitters spaced at different azimuthal intervals. The tool body 105 may also support a number of transmitter ring configurations that are spaced axially relative to one another along the central tool axis. The tool body 105 also supports an array of receiver elements 130 that are spaced around the outer circumference of tool body 105 at different azimuthal angles θ (in a ring configuration) at a common axial location (e.g., $z_r$) along the tool axis as shown. The common axial location (e.g., $z_r$) of the array of receiver elements 130 is spaced apart from and up or above the common axial location (e.g., $z_t$) of the array of transmitter elements 120 along the central tool axis as shown. For example, the array of receiver elements 130 can include a ring of eight receiver elements spaced at forty-five degree intervals of azimuth, or a ring of sixteen receiver elements spaced at twenty-two and a half degree intervals of azimuth, or possibly a ring of a different number of receivers spaced at different azimuthal intervals. The tool body 105 may also support a number of receiver ring configurations that are spaced axially relative to one another along the central tool axis and spaced above the transmitter ring configuration(s). The tool body 105 can also house a controller (not shown) for controlling the transmitter elements of the transmitter array(s) and the receiver elements of the receiver array as described herein. Alternatively, the controller can be external to the tool body 105, such as embodied by the processor 110 at the surface.

In embodiments, the controller can provide for individual control of each transmitter element of the transmitter array(s) 120 in terms of the amplitude (e.g., an amplitude factor or weight) of a guided mode acoustic signal that is emitted by the transmitter element as well as its excitation initiation time. The control of the excitation initiation times of the respective transmitter elements of the array(s) allows for control of variable time delay between the excitation initiation times of the transmitter elements and thus the relative phases of the guided mode acoustic signals that are emitted by the transmitter elements as described hereinafter.

In embodiments, each given transmitter element can be assigned a weight value in the range from a weight value $W_{off}$ (or 0% of maximum amplitude) where the given transmitter element is turned off and thus does not contribute to focused acoustic beam and a weight value $W_{max}$ (or 100% of maximum amplitude) where the given transmitter element is operated at maximum amplitude. The weight values between $W_{off}$ and $W_{max}$ can correspond to varying percentage of the maximum amplitude of the given transmitter element. Furthermore, the given transmitter element can be assigned a time delay in a range from null or zero time delay to some predefined maximum time delay.

Note that each transmitter element of the array 120 can be configured as an electronically-controlled acoustic transducer that emits a particular borehole guided mode acoustic signal (or a particular family of borehole guided mode acoustic signals) for transmission and wave guided propagation in the borehole environment of the well 50 where the amplitude and excitation timing of the emitted borehole guided mode acoustic signal (or family) is electronically-controlled by the controller according to a corresponding amplification factor or weight and time delay assigned dynamically to the transmitter element. In embodiments, the acoustic energy of the particular borehole guided mode acoustic signal (or a particular family of borehole guide mode acoustic signals) that is emitted by the electronically-controlled acoustic transducer is within a narrowband in the ultrasonic frequency range that extends from 1 kHz up to 2 MHZ and possibly beyond to several gigahertz. The narrowband can extend over 50 kHz (and more preferably over 25 kHz or less) in this ultrasonic frequency range. The electronically-controlled acoustic transducer can be an electromagnetic acoustic transducer (EMAT), piezoelectric transducer or magneto strictive transducer, provided that such transducer is configured to emit the particular guided model signal or family (e.g., L-mode or T-mode acoustic signal) for guided wave propagation by the cylindrical structure(s) of the intended borehole environment. In one embodiment, the particular guided mode acoustic signal (or the particular family of guide mode acoustic signals) that is emitted by the electronically-controlled acoustic transducer is a narrowband L(m,2) guided mode family in the ultrasonic frequency range that extends from 100 kHz up to 150 kHz (FIG. 2B). In embodiments, the controller can controllably vary the amplitude of the emitted borehole guided mode acoustic signal (or family) emitted by the acoustic transducer by electronic control of a variable-gain amplifier that drives the acoustic transducer. Furthermore, the controller can controllably vary the time delay of the emitted borehole guided mode acoustic signal (or family) emitted by the acoustic transducer by controlling the timing of the excitation signal supplied to the variable-gain amplifier that drives the acoustic transducer. Other suitable schemes that control the amplitude and time delay of the acoustic transducer can also be used.

Although the transmitter array 120 is described as having a plurality of individual elements, it is not so limited. For example, a single element can be segmented to create individual actuating elements. For example, a cylinder or disk of piezoelectric material can be cut, grooved, diced or otherwise segmented and individually actuated to create the array of transmitters from one or more chosen shapes. Also note that the transducers are not limited to the specific configurations described herein, as the transducers can be shaped and configured in any manner to allow for transmission of the guided mode acoustic signals (or family) in the intended borehole environment.

In embodiments, the controller can provide for individual control of each receiver element of the receiver array(s) 130 in terms of an amplification factor and time delay that are applied to acoustic waveforms that are detected by the receiver element. The control of time delay allows for control of variable time delay between the acoustic waveforms that are detected by the receiver elements of the array(s) 130 and thus the phase of the acoustic waveforms that are detected by the receiver elements of the array(s) 130 as described hereinafter.

In embodiments, each given receiver element can be assigned a weight value in the range from a weight value $W_{off}$ (or 0% of maximum amplification) where the acoustic waveforms that are detected by the receiver element are not amplified and thus suppressed or otherwise minimized, and a weight value $W_{max}$ (or 100% of maximum amplification) where the acoustic waveforms that are detected by the receiver element are amplified at a maximum amplification factor. The weight values between $W_{off}$ and $W_{max}$ can correspond to varying percentage of the maximum amplification of the acoustic waveforms that are detected by the receiver element. Furthermore, the given receiver element can be assigned a time delay in a range from null or zero time delay to some predefined maximum time delay.

Note that each receiver element of the array 130 can be configured as an acoustic transducer that receives the particular borehole guided mode acoustic signal (or a particular family of borehole guided mode acoustic signals) that travels by wave guided propagation in the borehole environment of the well 50 with signal processing circuitry electronically-controlled by the controller that amplifies and applies a time delay to the acoustic waveforms received by the receiver element according to a corresponding amplification factor (or weight) and time delay assigned dynamically to the receiver element. In embodiments, the particular borehole guided mode acoustic signal (or a particular family of borehole guide mode acoustic signals) that is received by the acoustic transducer is within a narrowband in the ultrasonic frequency range that extends from 1 kHz up to 2 MHz and possible higher to several gigahertz. The narrowband can extend over 50 kHz (and more preferably over 25 kHz or less) in this ultrasonic frequency range. The acoustic transducer can be an electromagnetic acoustic transducer (EMAT), piezoelectric transducer or magneto strictive transducer, provided that such transducer is configured to received the particular guided model signal or family (e.g., L-mode or T-mode acoustic signal) that travels by wave propagation guided by the cylindrical structures of the intended borehole environment. In one particular embodiment, the particular guided mode acoustic signal (or the particular family of guide mode acoustic signals) is a narrowband L(m,2) guided mode family in the ultrasonic frequency range that extends from 100 kHz up to 150 kHz (FIG. 2B). In embodiments, the controller can controllably vary the amplification of the acoustic waveforms detected by the acoustic transducer by electronic control of a variable-gain amplifier that processes the detected acoustic waveforms. Furthermore, the controller can controllably vary the time delay of the acoustic waveforms detected by the acoustic transducer by controlling a variable delay line that processes the detected acoustic waveforms. Note that the signal processing functions of the variable gain amplifier and variable delay line can be carried out in the analog domain (before analog-to-digital conversion of the detected acoustic waveforms) or in the digital domain (after analog-to-digital conversion of the detected acoustic waveforms). Other suitable schemes that control the amplitude and time delay of the detected acoustic waveforms can also be used.

Furthermore, although the receiver array 130 is described as having a plurality of individual elements, it is not so limited. For example, a single element can be segmented to create individual receiver elements. For example, a cylinder or disk of piezoelectric material can be cut, grooved, diced or otherwise segmented and individually actuated to create the array of receivers from one or more chosen shapes. Also note that the transducers are not limited to the specific configurations described herein, as the transducers can be shaped and configured in any manner to allow for reception of the guided mode acoustic signals (or family) in the intended borehole environment.

The processor 110 located on the surface (and/or alternatively located downhole and housed within the tool body 105 or some other tool body) may be configured to perform various functions including receiving, storing, transmitting and/or processing data from the acoustic logging tool. The processor 110 can include a number of suitable components, such as a processors, memory, communication devices and power sources. Communication can be achieved by any suitable configuration, such as electrical, optical, wireless or acoustic (e.g., mud-pulse telemetry) communication. The processor 110 can be configured to collect and process data that represents the acoustic signals received by the receiver elements of the receiver arrays(s) 130 to provide desired answer products related to the borehole environment in the vicinity of the tool body 105.

For purposes of example only, FIG. 1A shows the borehole environment containing a single pipe (casing) and the disclosure describes how localization of the focused acoustic beam at a particular desired zone in this borehole environment is achieved. In alternate embodiments, the wireline acoustic logging tool can be positioned in the well by other conveyance means, such as drill pipe, coiled tubing or a tractor. And in other embodiments, the wireline acoustic logging tool can be operated in a open (uncased) borehole (or open-hole geometry). In yet other embodiments, the acoustic logging tool can be part of a drill string that terminates at a drill bit for logging-while drilling (LWD) applications.

Figure 2A:
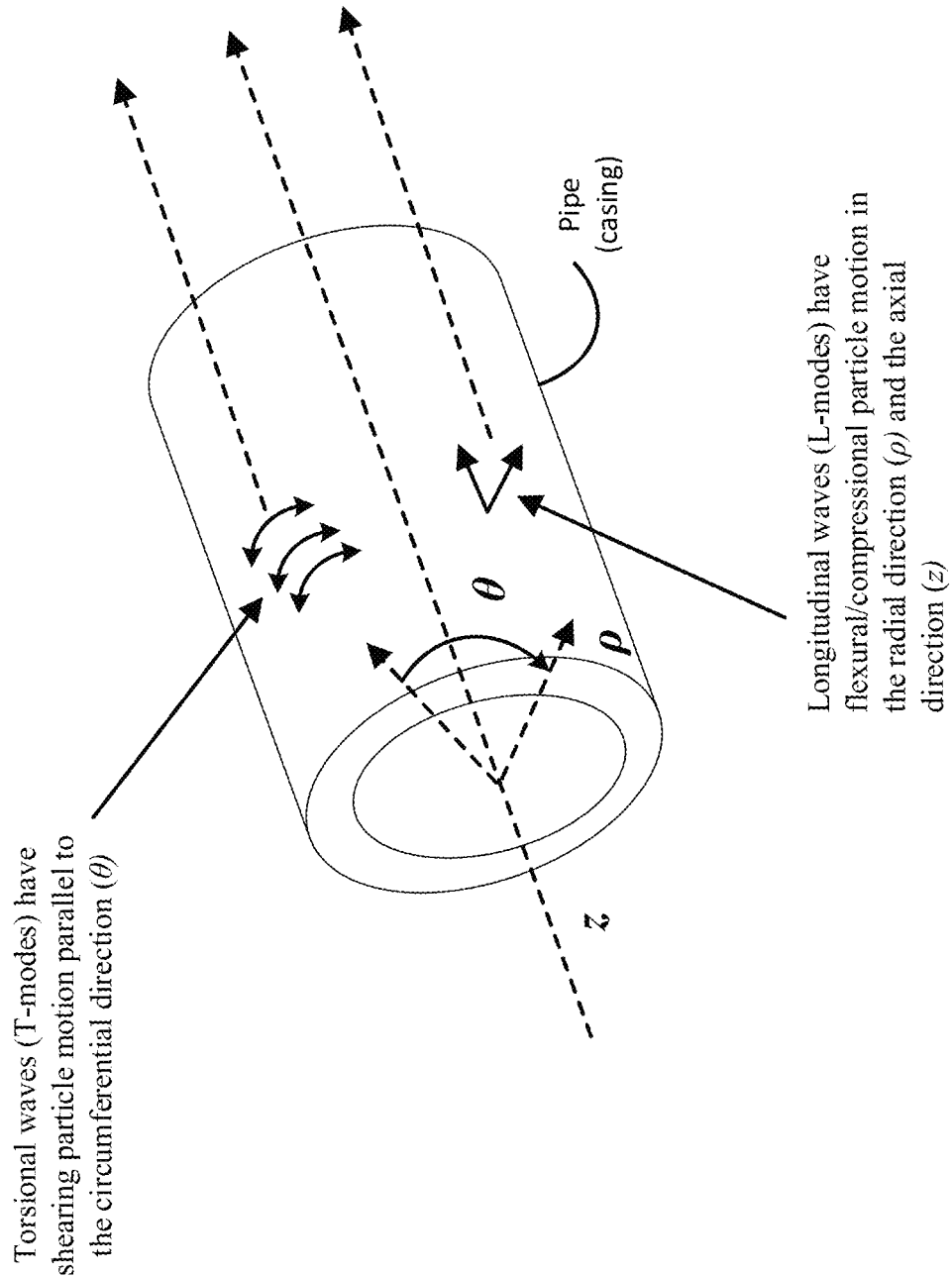
FIG. 2A is a schematic illustration of different types of borehole guided mode acoustic signals that can be emitted by the transmitter elements of the transmitter array 120 (or emitted by some other transmitter configuration) for guided wave propagation by the cylindrical structures (e.g., casing) of the intended borehole environment and received by the receiver elements of the receiver array 130 for processing.
Figure 2B:
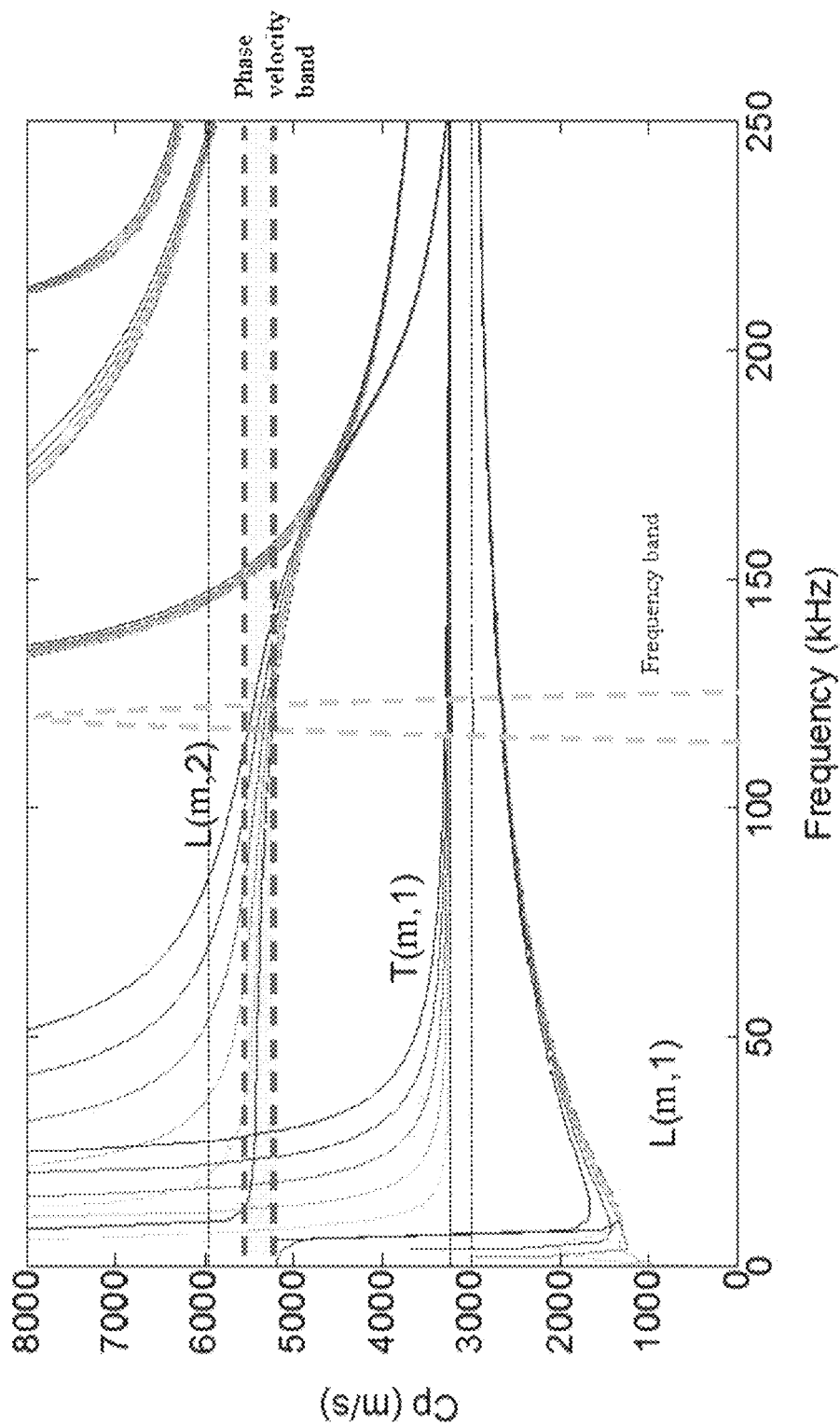
FIG. 2B shows phase velocity dispersion curves of families of longitudinal waves (L-modes) and torsional waves (T-modes) with higher order azimuthal symmetries in a steel pipe with 4.23 inch ID and 4.75 inch OD.

FIG. 2A illustrates different types of borehole guided mode acoustic signals that can be emitted by the transmitter elements of the transmitter array 120 (or emitted by some other transmitter configuration) for guided wave propagation by the cylindrical structures (e.g., casing) of the intended borehole environment and received by the receiver elements of the receiver array 130 for processing. Such borehole guided mode acoustic signals include torsional waves (T-mode acoustic signals) and longitudinal waves (L-mode acoustic signals). The torsional waves (T-mode acoustic signals) have shearing particle motion parallel to the circumferential direction (θ). The longitudinal waves (L-mode acoustic signals) have flexural/compressional particle motion in the radial direction (ρ) and the axial direction (z) as show.

FIG. 2B shows phase velocity dispersion curves in a single steel pipe (such as pipe 32) with inner and outer diameters of 4.23 and 4.75 inches, respectively. Each dispersion curve line in FIG. 2B represents a guided mode that exists in the pipe. The pipe is a cylindrical waveguide that is analogous to the casing 70 of the well 50 shown in FIG. 1A. These guided modes propagate along a length of the pipe and are usually dispersive with respective to frequency. On the other hand, the cased-borehole geometries are fluid-solid composite waveguides embedded in infinite formation media. The borehole guided modes propagate along the length of the wellbore while leaking energy in the surrounding formation. The guided modes in the cylindrical waveguide can be represented by two indices, for example L(m,N) and T(m,N), where m is the order of guided mode azimuthal symmetry, and N is the $n^{th}$ root of the characteristic equation. L and T represent the longitudinal and torsional nature of the waves respectively. Conventionally, guided modes with the same N and various circumferential order M are often called a "mode family". When m=0, the guided modes have uniformly distributed azimuthal energy which is referred as axisymmetric waves (monopole). The waves with nonzero circumferential orders are referred as higher order multi-pole waves. As an example, the mode family L(m,2) seen in FIG. 2B is a longitudinal mode family with mode number 2. Hereinafter, for purposes of illustration only, a narrowband L(m,2) mode family centered around 115 kHz is used to demonstrate how localization of a focused acoustic beam as emitted by an array of transmitter elements is achieved. While according to one aspect, the L(m,2) mode family is found to be useful in finding cement defects, it will be appreciated that other individual guided modes and mode families can be utilized if desired.

In order to understand the behavior of the borehole guided modes (which are guided by the cylindrical waveguide(s) of the intended borehole environment), the wave displacement and stress and energy distribution in the radial direction of a cylinder, which is referred to as mode shapes, is studied. FIGS. 3A-3F show sample mode shapes in a steel pipe within the sample modal family L(m,2). The monopole mode shapes of L(0,2) as well as the higher order multi-pole waves with circumferential order up to order L(5,2) are shown. As will be described hereinafter, an intelligent selection of the borehole guided mode based on a mode shape analysis can be used to localize transmitted acoustic energy to a certain radial depth in the borehole environment.

Figure 4B:
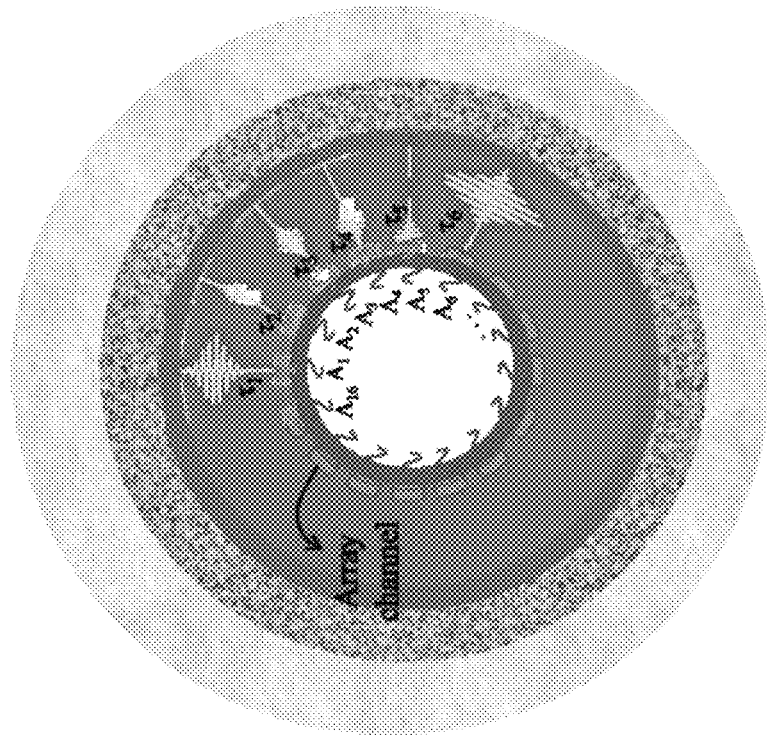
FIGS. 4A and 4B show an acoustic logging tool having a 16-channel wellbore acoustical array in accordance with one embodiment of the present disclosure.
Figure 4A:
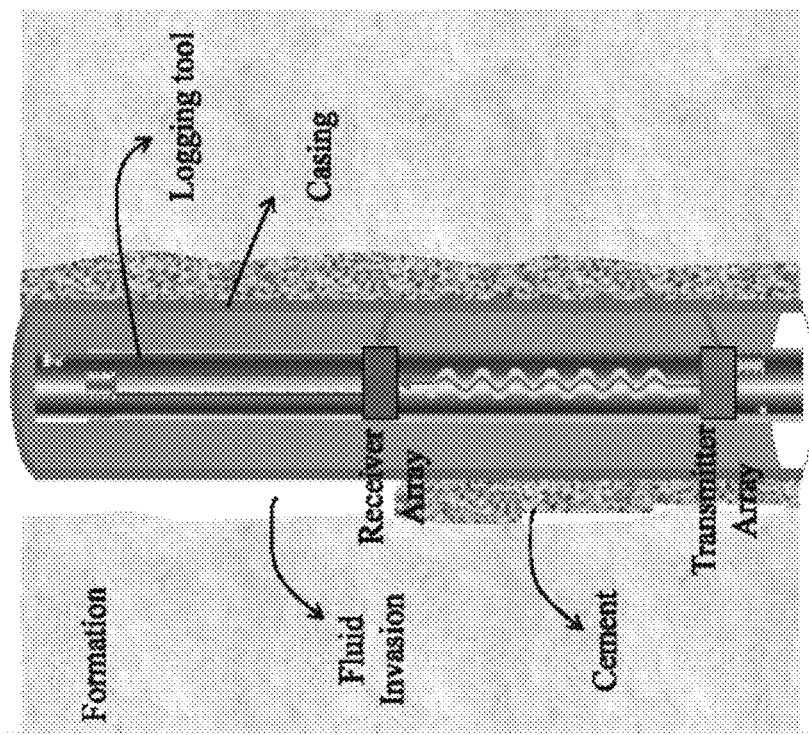

FIGS. 4A and 4B illustrate an example acoustic logging tool that employs an array of sixteen transmitters, an array of receivers and a controller (not shown) which controls the amplitude factors and time delays (phase) of the borehole guided mode signals emitted by the individual sixteen transmitters of the array. When the sixteen transmitters (channels) are excited simultaneously, axisymmetric waves (monopole) are generated with a modal preference that determines the beam launching angle. However, as explained in detail hereinafter, acoustic energy localization can be achieved by applying a proper amplitude factor and excitation time delay to each transmitter (i.e., array channel). The amplitude factors and time delays that produce a focused acoustic beam at a desired zone in the borehole environment can be calculated based on the dispersive and acoustic wave fields in the borehole environment (e.g., an open or cased wellbore).

In case of exciting (or firing) only one of the sixteen transmitters, a partial loading condition is encountered. The source influence acoustic fields are determined by the loading function, transducer size, launching angle, etc. The resulting wave fields in an open or cased wellbore (e.g., a pipe) can be derived from:

$$P_{nm}^{MN} = 0, \text{ unless } m = n \text{ and } k_n^M = k_m^N \quad (1)$$

$$P_{nm}^{MN} = -\frac{1}{4} \int\int_D (v_n^{M*} \cdot T_m^N + v_m^N \cdot T_n^{M*}),$$

where $P_{nm}^{MN} \neq 0$ is the complex power flux in the wave propagation direction, $k_n^M$ is the wavenumber of the unique mode such that $P_{nm}^{MN} \neq 0$, and v and T are the particle velocity vector and stress tensor of the $n^{th}$ or $m^{th}$ circumferential order, i.e. the order of the Bessel functions, and $M^{th}$ or $N^{th}$ root of the corresponding Bessel functions, i.e. the $M^{th}$ or $N^{th}$ mode group. The orthogonality relation and completeness of the wave field provide basis for a Normal Mode Expansion (NME) analysis, based on which, the resulting amplitude of each normal mode generated by a specific partial loading can be evaluated. For a source loading by a single transduction channel, the loading function is given by:

$$T^p \cdot n = \begin{cases} -p_1(\theta)p_2(z)e_r, & |z| \leq L, |\theta| \leq \alpha, r \neq b \\ 0, & |z| > L, \text{ or } |\theta| > \alpha \text{ or } r \neq b \end{cases} \quad (2)$$

where $T^p$ and n are the external loading stress and the surface normal, respectively. The amplitude of the L(n,M) mode (e.g., the L(m,2) mode) generated by the loading function (Equation (2)) is given by $$A_{+n}^M(z) = -\frac{R_{nr}^{M*} e^{-ik_n^M z}}{4P_{nn}^{MM}} \int_{-\alpha}^{-\alpha+2\pi} \Theta_r^n(n\theta) p_1(\theta) d\theta \int_{-\infty}^{+\infty} p_2(z) e^{ik_n^M z} dz, \quad (3)$$

where $R_{nr}^{M*}$ is the wave structure in the radial direction for mode L(n,M), and $\theta_r^n(n\theta)$ is the azimuthal displacement distribution, which is basically a sinusoidal function. Equation (3) indicates that for an axisymmetric loading function, for which $p_1(\theta)=1$ within $0 \leq \theta \leq 2\pi$, the first integral in Eq. (3) vanishes except for n=0. This explains quite well the fact that only monopole modes will be generated in the case of axisymmetric loading.

A summation of the generated modes weighted by their corresponding amplitude factors and time delays (phases) yields the guided wave displacement/energy distribution due to a specific partial loading function. An angular profile is defined as the energy displacement/energy distribution around the pipe circumference at a certain axial distance from the partial loading source.

Figure 5:
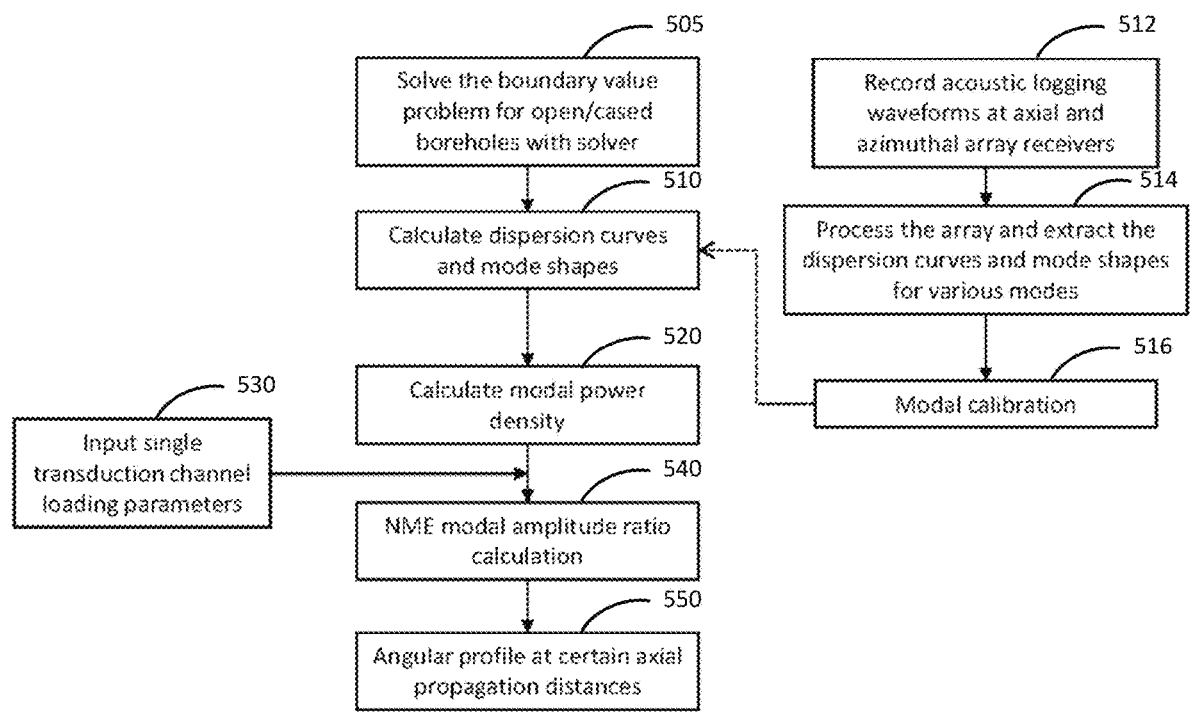
FIG. 5 is a flowchart illustrating a method for angular profile calculation that results from a single transduction channel loading, in accordance with one embodiment of the present disclosure.

According to one aspect, a method for calculating angular profile resulting from single transduction channel loading in open or cased wellbore geometries is seen in FIG. 5. At 505, the boundary value problem for an idealized model open or cased borehole may be solved by computational analysis with one or more processors, such as with an analytical method as described in in "A three-dimensional dyadic Green's function for elastic waves in multiplayer cylindrical structures", Lu et al., J. Acoust. Soc. Am., 98(5), 1995, pp. 2825-2835, and/or with a semi-analytical finite element method as described in "Theoretical and experimental investigations of acoustic waves in embedded fluid-solid multi-string structures, Liu et al, Appl. Phys. Lett., 110, 2017, pg. 101906.

At 510, dispersion curves are calculated and mode shapes are generated (as in FIG. 2B). A thorough analysis of the dispersion curves can lead to an intelligent selection of a specific borehole guided modal family that is advantageous in acoustic beam focusing. More importantly, the analysis of mode shapes will lead to acoustic energy control in the radial direction of the wellbore.

Optionally, and as shown at 512, 514, and 516, the dispersion curves and mode shapes generated at 510 can be calibrated with initial data acquisition to account for differences from the idealized model. For example, using a standard Sonic Scanner type tool, acoustic logging waveforms may be recorded using an axial and azimuthal array of receivers at 512. The received waveforms may then be processed to extract the dispersion curves and mode shapes for various guided modes at 514, and a modal calibration may be generated at 516 to calibrate the model with field measurement data. The modal calibration may then be used to ensure the model is accurate.

At 520, a modal power density (power flux) is calculated. The modal power density is a physical quantity that represents the energy of the guided waves.

At 530, one or more single transduction channel loading parameters are provided. In embodiments, the single transduction loading parameters can include one or more of the following: an axial length (L) along the z direction, an azimuthal coverage ($\alpha$), and loading pressures $p_1(\theta)$ and $p_2(z)$. Pressures $p_1(\theta)$ and $p_2(z)$ represent the azimuthal and axial distribution functions of the pressures, respectively. The distributions are dependent on the transduction methods, assuming a constant loading for $p_1(\theta)$ and $p_2(z)$. In these theoretical calculations, it can be assumed the borehole geometry are perfectly round and there is no breakout or other geometric irregularities.

At 540, the modal power density of 520 and the single transduction channel loading parameter(s) of 530 can be used in conjunction with normal mode expansion to calculate the normal mode expansion (NME) modal amplitude ratios according to equations (2) and (3). The normal mode expansion is a mathematical tool to analyze the acoustic wave field of guided modes. The calculated NME modal amplitude ratios represent the normalized amplitude of guided modes that result from the loading specified by the single transduction channel loading parameter(s) provided in 530.

Then, at 550, the angular profiles at certain axial propagation distances may be generated. Such angular profiles are calculated by summation of all the resulted guided modes due to the specified loading at certain propagation distances.

Figure 6A:
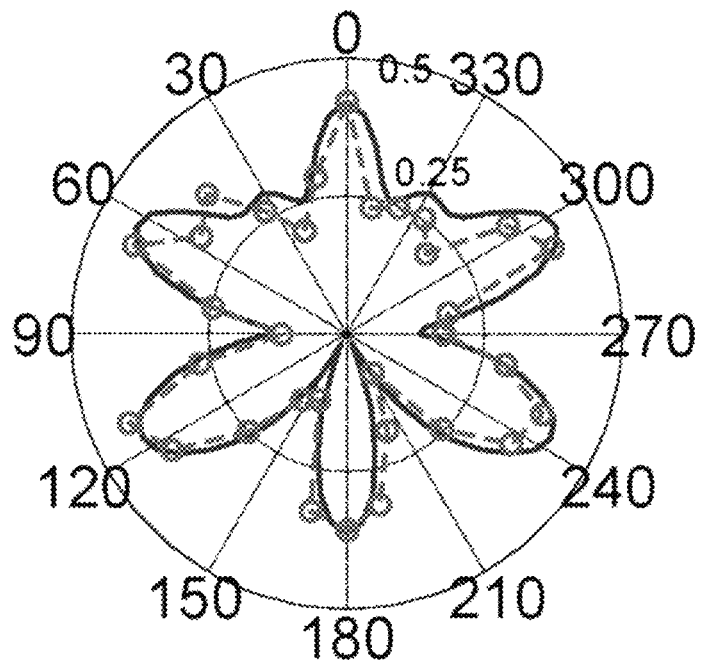
FIGS. 6A and 6B show an angular profile due to a single channel loading at different propagation distances.
Figure 6B:
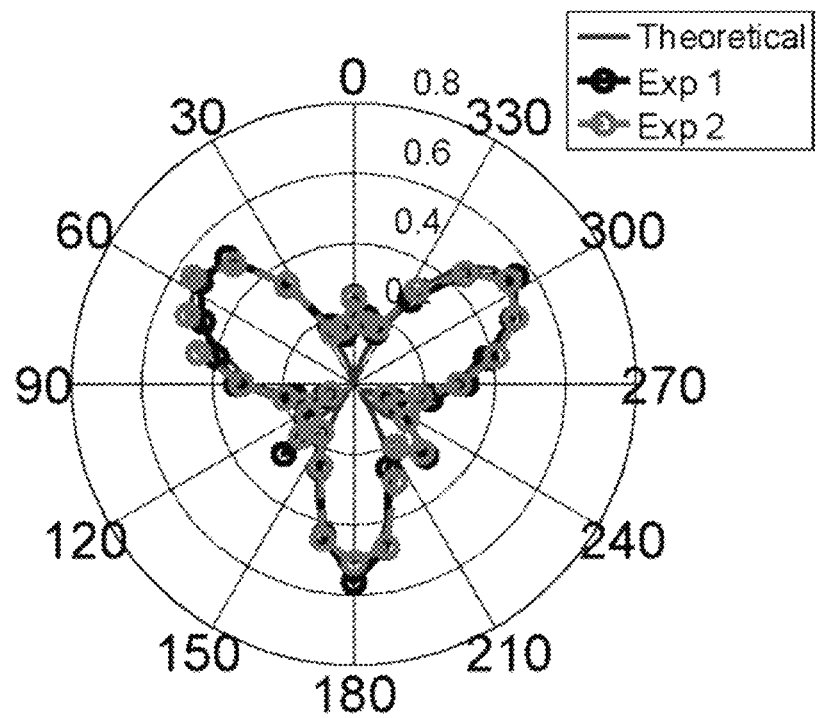

FIGS. 6A and 6B show sample angular profiles calculated at 550 and measured for the L(m,2) mode group at two different axial propagation distances (displaced along borehole axis z) of one meter (FIG. 6*a*) and two meters (FIG. 6*b*) for a 22.5 degree loading (i.e., sixteen transmitters spaced equally circumferentially) at 115 kHz. It is seen in FIGS. 6*a* and 6*b* that the azimuthal acoustic energy distribution changes and exhibits unique patterns along the propagation distance. The experimental (measured) results are seen to agree well with theoretical predictions determined by the method of FIG. 5.

Figure 7:
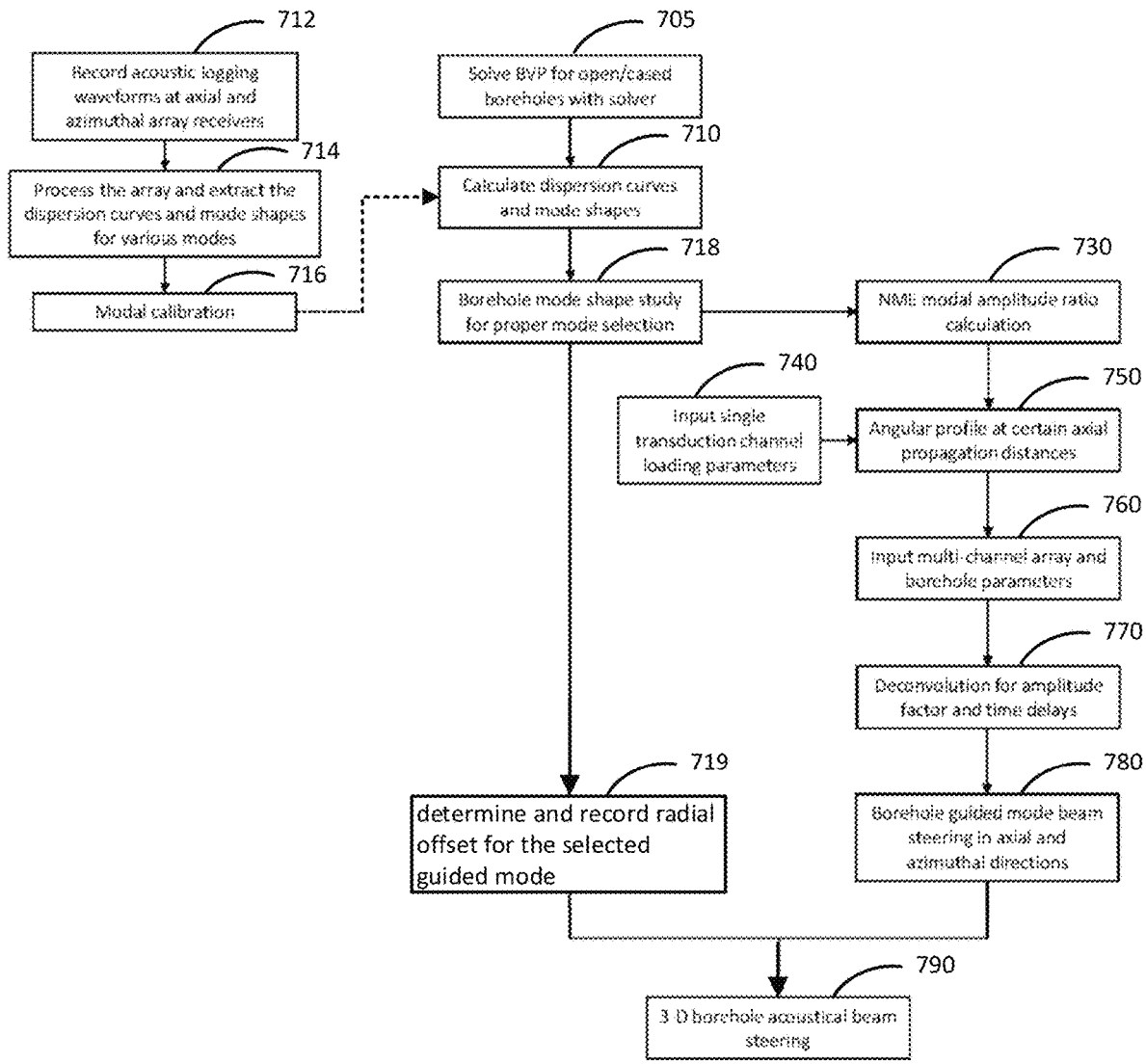
FIG. 7 is a flow chart illustrating a method for controlling the transmitter array to produce a focused acoustic beam at a desired zone in the borehole environment in accordance with one embodiment of the present disclosure.

While FIGS. 5, 6A, and 6B are related to a single transduction channel, FIG. 7 displays a workflow utilized to localize acoustic energy in three dimensions (radially, axially and azimuthally) through multiple transduction channels. The procedure can be performed by the controller of the acoustic logging tool (possibly in conjunction with control signals from another downhole tool or surface-located processor) to acquire the focusing parameters and results therefrom as described below.

In this embodiment, operations 705, 710, 712, 714 and 716 are similar to steps 505, 510, 512, 514, and 516 of FIG. 5 and the results are used at 718 to study possible shapes of the borehole guided mode emitted by the transmitters of the array and select or design the transmitters of the array to emit a particular borehole guided mode or family of guided modes (such as the L(m,2) mode family). Such borehole guided mode(s) propagate into the borehole environment (e.g., formation in an open borehole or a casing or surrounding cement in a cased borehole) at a characteristic radial offset (e.g., fixed radial component) from the transmitters of the array as determined and recorded at 719.

For tuning the angular profile of the particular borehole guided mode or mode family at an axial propagation distance z from the transmitter array, the angular profile for "element 0", i.e., the transmitter placed on the "azimuthal top" (angle=0) of a pipe, is a periodic function $H(\theta)$ with a period of $2\pi$ and $\theta$ representing the varying azimuthal direction. It is also assumed that the performances of all of the transmitter elements spaced around the circumference of the borehole are identical. Therefore, the angular profile of element i will be $H(\theta-\theta_{d\ i})$, where $\theta_i$ is the azimuthal position of the element i. Functions $H(\theta-\theta_i)$ come directly from the results of the angular profiles 550. The total angular profile $G(\theta)$ at the axial propagation distance z will be a superposition of the angular profiles of all of the elements according to:

$$G(\theta) = \sum_{i=0}^{N-1} A(\theta_i) H(\theta - \theta_i) = A \otimes H, \quad (4)$$

where $A(\theta_i)$ is the weight for summed angular profiles, and $\otimes$ represents a convolution. It will be appreciated that $A(\theta_i)$ is a complex function, whose norm and phase are respectively represented by the excitation amplitude factor and time delay applied on each element. Equation (4) also shows that the total angular profile is the circular convolution between the weight function, $A(\theta_i)$, and the single element angular profile function, $H(\theta)$. Therefore, given the excitation amplitude factors and time delays applied on the elements and the angular profile function, the total angular profile $G(\theta)$ at the axial propagation distance z can be calculated.

For an inverse problem (e.g., the focused angular profile tuning), an azimuthal direction $\theta$ and axial propagation distance z is input to solve for a desired total angular profile $G(\theta)$. The distribution function $A(\theta_i)$ that generates the desired total angular profile $G(\theta)$ can be calculated based on a deconvolution algorithm derived from Eqn. (4), which is:

$$A(\theta_i) = G \otimes^{-1} H$$

$$A(\theta_i) = FFT^{-1}(G(\omega)/H(\omega)) \quad (5)$$

where $\otimes^{-1}$ represents a deconvolution. Equation (5) shows that deconvolution can be fulfilled by direct and inverse (fast) Fourier transforms. It can be used for calculating the amplitude factors and time delays needed for angular profile tuning to achieve guided wave beam steering in the borehole environment. Note that $A(\theta)$ is a complex function, therefore the amplitude factor and the time delays can be deduced from the amplitude and phase of $A(\theta)$.

In this manner, Eqn. (5) and the related calculations can be used to derive a model (e.g., system of equations) that relates azimuthal direction $\theta$ and axial propagation distance z specified as inputs to amplitude factors and time delays for the transmitter elements of the transmitter array that will produce a focused acoustic beam at a zone in the borehole environment that corresponds to the azimuthal direction $\theta$ and axial propagation distance z. Thus, an azimuthal direction $\theta$ and axial propagation distance z can be specified as inputs to this model, and the model can be solved to determine amplitude factors and time delays for the transmitter elements of the transmitter array that will produce a focused acoustic beam at a zone in the borehole environment that corresponds to the azimuthal direction $\theta$ and axial propagation distance z.

In other embodiments, the model can be embodied by another representation (such as a table, array or list) that relates azimuthal direction θ and axial propagation distance z specified as inputs to amplitude factors and time delays for the transmitter elements of the transmitter array that will produce a focused acoustic beam at a zone in the borehole environment that corresponds to the azimuthal direction θ and axial propagation distance z.

Given the above, the operations 730, 740 and 750 are similar steps to the operations of 520, 530, 540 and 550 of FIG. 5 to generate an angular profile at certain axial propagation distances for a single input transduction channel. These results are used in the operations of 760 and 770 to derive the model that relates azimuthal direction and axial propagation distance specified as inputs to amplitude factors and time delays for the transmitter elements of the transmitter array so that the summed borehole guided mode signals generated by the transmitters of the array form a focused acoustic beam at a zone in the borehole environment that corresponds to the azimuthal direction and axial propagation distance specified by the input. In embodiments, the model can be configured such that the range of azimuthal direction and axial propagation distance specified as inputs to the model cover different zones in the borehole environment. For example, such zones can possibly cover zones located within the full 360 degree azimuthal range around the tool body and a range of axial positions along the length of the tool body.

In block 780, a particular azimuthal direction and axial propagation distance that corresponds to a desired zone of interest can be specified as inputs to this model, and the model used to determine amplitude factors and time delays for the transmitter elements of the transmitter array that will produce a focused acoustic beam at the desired zone of interest. Note that the radial component of the desired zone of interest, which corresponds to offset relative to the transmitter array in the radial dimension ρ in the borehole (FIG. 1B), is determined by the borehole guided mode(s) emitted by the array of transmitters as described above.

In block 790, the amplitude factors and time delays for the transmitter elements of the transmitter array as output by the model in 770 are applied dynamically to the transmitter elements of the transmitter array such that the transmitter elements of the transmitter array produce a focused acoustic beam at or near the desired zone of interest. Note that the radial component of the resulting focused acoustic beam is determined by the borehole guided mode(s) emitted by the array of transmitters as described above. Such control can be configured for deep probing with high azimuthal resolution by the focusing of the wellbore acoustic energy azimuthally, axially, and radially.

In order to derive the model of 760, channel array parameters and borehole parameters can be provided. The channel array parameters can include the number of transmitter channels and loading function parameters. The borehole parameters can include borehole geometries (such as borehole radius) and material properties of the borehole. These parameters are used for theoretical calculation of focal parameters.

At 770, a deconvolution as described above with respect to equation (5) is conducted in order to find the amplitude factor and time delay for each transmitter element of the transmitter array, i.e., $A(\theta_i)$. In this step, the frequency domain values of the desired focused beam profile, $G(\omega)$, and the periodic function $H(\omega)$ is known or assumed. The amplitude factors and time delays for each transmitter element of the transmitter array provide for superpositioning the transmitter signal waves in a manner that produces a focused acoustic beam in a desired axial and azimuthal direction as indicated at 780. With the radial component (e.g. radial offset) of the selected guided mode recorded in 719, the amplitude factors and time delays determined at 770 can be used to control the emission of the selected borehole guide mode (or mode-family) by the transmitter elements of the array to produce the focused acoustic beam as indicated at 790. The focused acoustic beam localizes acoustic energy at a desired zone in the borehole environment. This desired zone in the borehole environment lies along axial and azimuthal directions which correspond to the amplitude factors and time delays for the transmitter elements of the transmitter array as determined 770 at the radial component of the selected guided mode recorded in 719.

According to one aspect, and as discussed hereinafter, such a focused acoustic beam permits measurements and determinations with respect to the surroundings of the borehole, not previously obtainable.

According to another aspect, by changing the selection of the first transmitter element (channel) and/or providing different amplitude factors and time delays for the transmitter elements (channels) of the transmitter array, a series of experiments may be conducted to provide a plurality of instances of the focused acoustic beam in different azimuthal directions and/or different axial directions. Thus, information specific to different azimuthal directions and/or axial directions about the borehole may be obtained.

Using the workflow of FIG. 7, theoretical analysis and actual experiments were conducted with an 8-channel phased transducer array placed in a steel pipe. The transducers were selected for generating the L(m,2) mode group centered at 115 kHz. The eight transmitters of the array were spaced circumferentially at 22.5 degrees intervals of azimuth. Equation (5) was utilized to calculate the time delay and amplitude controls for a predetermined beam steering axial and azimuthal position. For focusing at one meter from the source transmitters, the following amplitude factors and time delays were calculated for the transmitters as seen in Table 1.

TABLE 1

| CHANNEL NO. | AMPLITUDE FACTOR | PHASE DELAY (µs) |
| --- | --- | --- |
| 1 | 0.515 | 2.561 |
| 2 | 0.486 | 1.284 |
| 3 | 0.165 | 3.009 |
| 4 | 0.628 | 3.090 |
| 5 | 1.000 | 0.604 |
| 6 | 0.628 | 3.090 |
| 7 | 0.165 | 3.009 |
| 8 | 0.486 | 1.284 |

Figure 8A:
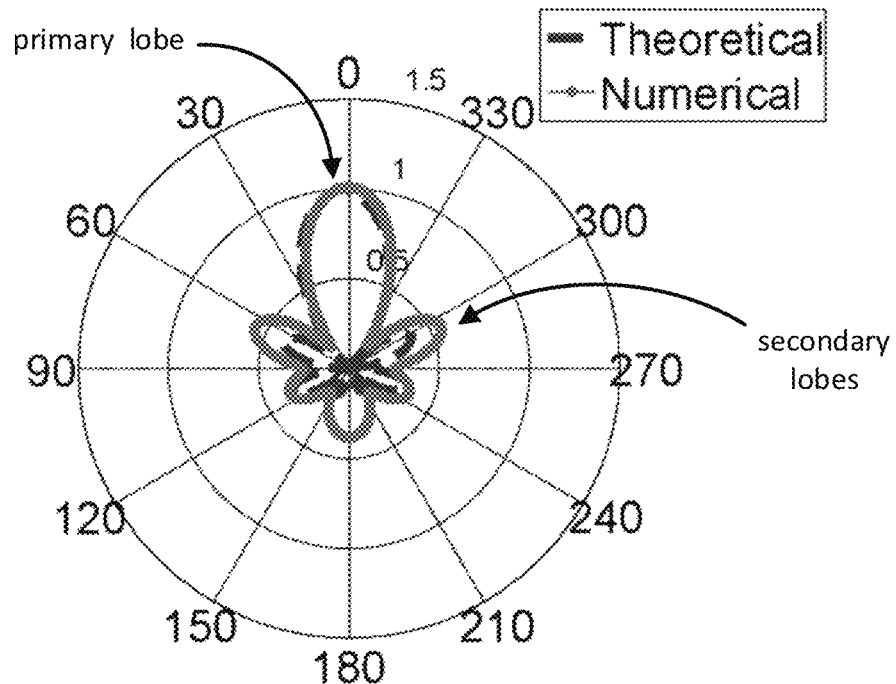
FIGS. 8A and 8B show an angular profile of the focused acoustic energy of multiple channels at different propagation differences utilizing steering of the focused acoustic beam by electronic control of the transmitter array of the acoustic logging tool.

The theoretical results from NME calculations and the numerical results from finite-element simulation of the detection of the resulting beam at a distance of one meter are plotted n FIG. 8A. These results show a focused acoustic beam with a primary lobe of acoustic energy having peak acoustic energy focused at 0° azimuthal direction. Note the primary lobe carries most (e.g., 80%) of the acoustic energy in a sixty degree azimuthal segment centered about the 0° azimuthal direction of its peak. Also note that there are secondary lobes with maximal acoustic energy in other azimuthal directions, but the peak energy of the primary lobe is approximately twice the maximal energies of the secondary lobes. This shows that the transmitter elements can be successfully arranged to generate a focused acoustic beam.

The same 8-channel arrangement was also analyzed for providing a focused profile at two meters, and equation (5)

was utilized to calculate the time delay and amplitude factors for the transmitters which are set forth in Table 2.

TABLE 2

| CHANNEL NO. | AMPLITUDE FACTOR | PHASE DELAY (μs) |
|---|---|---|
| 1 | 0.466 | 2.625 |
| 2 | 0.867 | 0.710 |
| 3 | 0.654 | 1.004 |
| 4 | 0.633 | 3.159 |
| 5 | 1.000 | 2.239 |
| 6 | 0.633 | 3.159 |
| 7 | 0.654 | 1.004 |
| 8 | 0.867 | 0.710 |

Figure 8B:
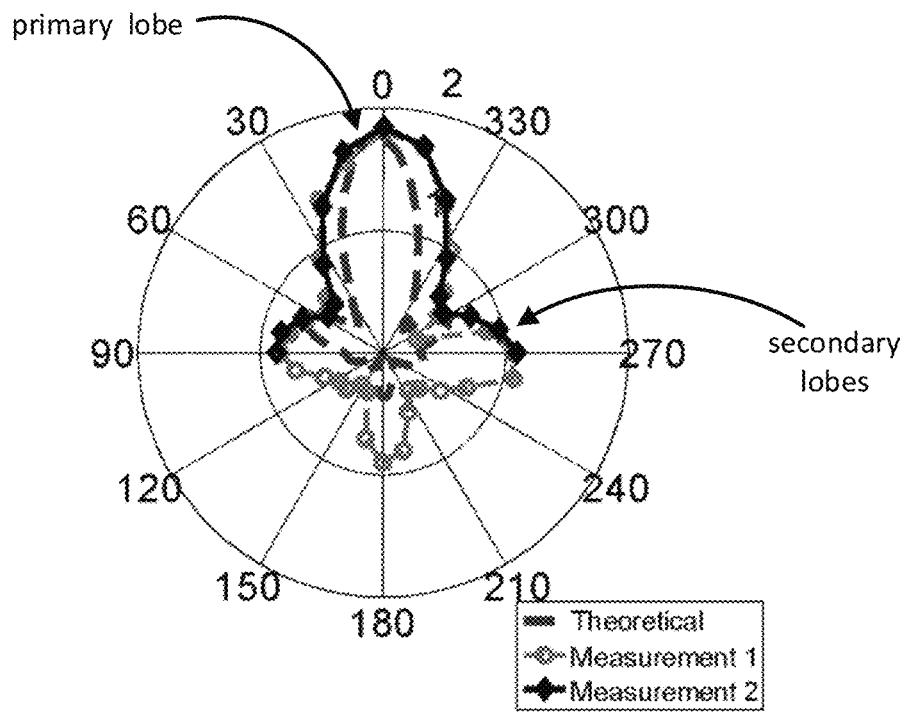

In addition to theoretical results, thirty-six acoustic detectors were azimuthally spaced at ten degree intervals two meters from the transmitters and two sets of measurements were made. The results are plotted in FIG. 8B, where the measured results correspond well to the theoretical results. Again, the particular 8-channel arrangement produced a focused acoustic beam with a primary lobe of acoustic energy having peak acoustic energy focused at 0° azimuthal direction. Note the primary lobe carries most (e.g., 75%) of the acoustic energy in a sixty degree azimuthal segment centered about the 0° azimuthal direction of its peak. Also note that there are secondary lobes with maximal acoustic energy in other azimuthal directions, but the peak energy of the primary lobe is approximately twice the maximal energies of the secondary lobes. This shows that the borehole guided mode signals can be successfully combined (through constructive interference) and focused at an expected azimuthal direction and axial propagation distance. Moreover, the mode selection can be used to localize the acoustic wave energy at certain radial depths. Furthermore, such control can be used to steer and focus the combined borehole guided mode signals at varying azimuthal direction and axial propagation distances. Therefore, the method and associated system described herein can be used for localizing wellbore acoustic energy axially, azimuthally and radially.

As previously suggested, it will be appreciated that the focused acoustic beam generated from the plurality of circumferentially spaced transmitters can be directed in azimuthal direction that covers the full 360 degrees around the tool. This can be accomplished by changing which transmitter is considered as channel 1 and adjusting the amplitudes and phase changes of the other transmitters accordingly. For example, if it is desired to change the azimuthal direction of an eight-transmitter array by ninety degrees, the transmitter previously assigned to be channel #3 may be selected as channel #1 with an amplitude factor of 0.466 and a phase delay of 2.625 μs, the transmitter previously assigned to be channel #4 may be assigned the amplitude factor of 0.867 and a phase delay of 0.710 μs, the transmitter previously assigned to be channel #5 may be assigned the amplitude factor of 0.654 and a phase delay of 1.004 μs, etc.

Figure 9:
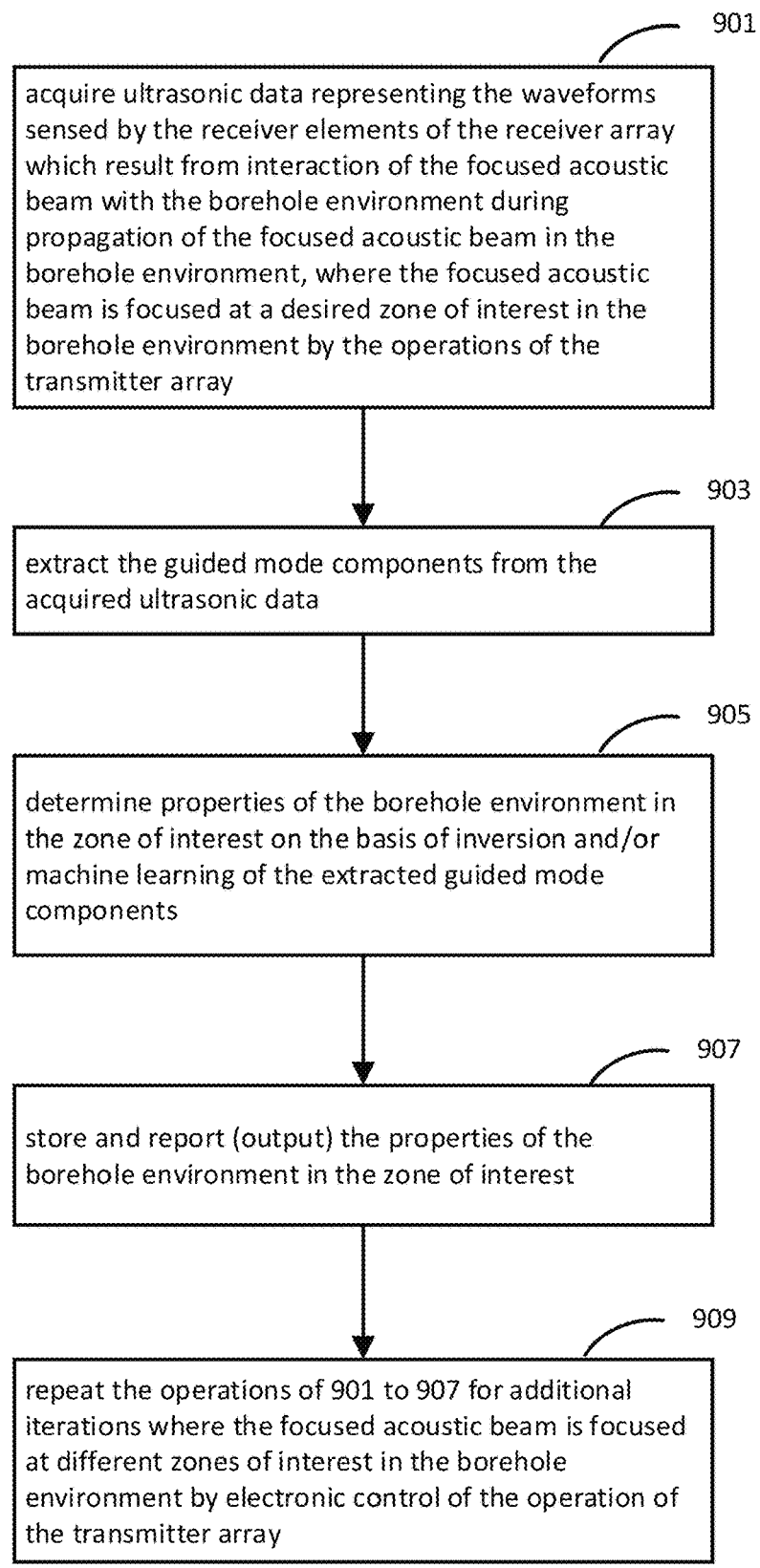
FIG. 9 is a flowchart illustrating operations that acquire and process data representing the acoustic waveforms detected by the receiver elements of the receiver array of the acoustic logging tool to a generate a log of properties of the borehole environment in a zone of interest interrogated by a focused acoustic beam emitted by the transmitter elements of the transmitter array of the acoustic logging tool.

FIG. 9 illustrates operations that acquire and process data representing the acoustic waveforms sensed by the receiver elements of the receiver array 130 of the acoustic logging tool to generate a log of properties of the borehole environment in a zone of interest interrogated by a focused acoustic beam emitted by the transmitter array 120 of the acoustic logging tool. The operations can be carried out by the processor 110 that is located at the surface or housed as part of the downhole tool or other tool.

In block 901, ultrasonic data is acquired that represents the waveforms sensed by the receiver elements of the receiver array which result from interaction of the focused acoustic beam with the borehole environment during wave guided propagation of the focused acoustic beam in the borehole environment. Note that the focused acoustic beam is focused at a desired zone of interest in the borehole environment by the electronic control of the transmitter array as described herein. Such data acquisition can involve analog-to-digital conversion, amplification (in the analog domain or digital domain) and spectral filtering (in the analog domain or digital domain) of waveforms detected by the receiver elements of the receiver array.

In block 903, the acquired ultrasonic data can be processed to extract the borehole guided mode components from the acquired ultrasonic data. The operations can involve narrow-band spectral filtering to extract the frequency range of the borehole guided mode components of interest. For example, in the case that the focused acoustic beam is produced from constructive interference of L(m,2) guided mode signals centered around 115 KHz, narrow-band spectral filtering with a passband around 115 KHz can be used to extract the frequency range of the borehole guided mode components of such L(m,2) guided mode signals.

In block 905, properties of the borehole environment in the zone of interest can be determined on the basis of inversion and/or machine learning of the extracted guided mode components. An example of such inversion is described below with respect to FIG. 10, and an example of such machine learning is described below with respect to FIG. 11.

In block 907, store and report (output) the properties of the borehole environment in the zone of interest as determined in block 905 can be stored and/or reported (output), for example by storing and outputting the properties of the borehole environment in the zone of interest as part of a log that is displayed on a graphical user interface.

In block 909, the operations of 901 to 907 can be repeated for additional iterations where the focused acoustic beam is focused at different zones of interest in the borehole environment by electronic control of the operation of the transmitter array. The different zones of interest can follow a circumferential path (at a fixed axial position) around the tool body to study azimuthal variations in the properties of the borehole environment. The different zones of interest can follow a helical path (at varying azimuthal and axial positions) or other desired complex paths with varying azimuthal and axial positions to study azimuthal and axial variations in the properties of the borehole environment.

Furthermore, the tool can be moved to another depth and the operations of 901 to 909 can be repeated in order to investigate another segment of the borehole environment.

Figure 10:
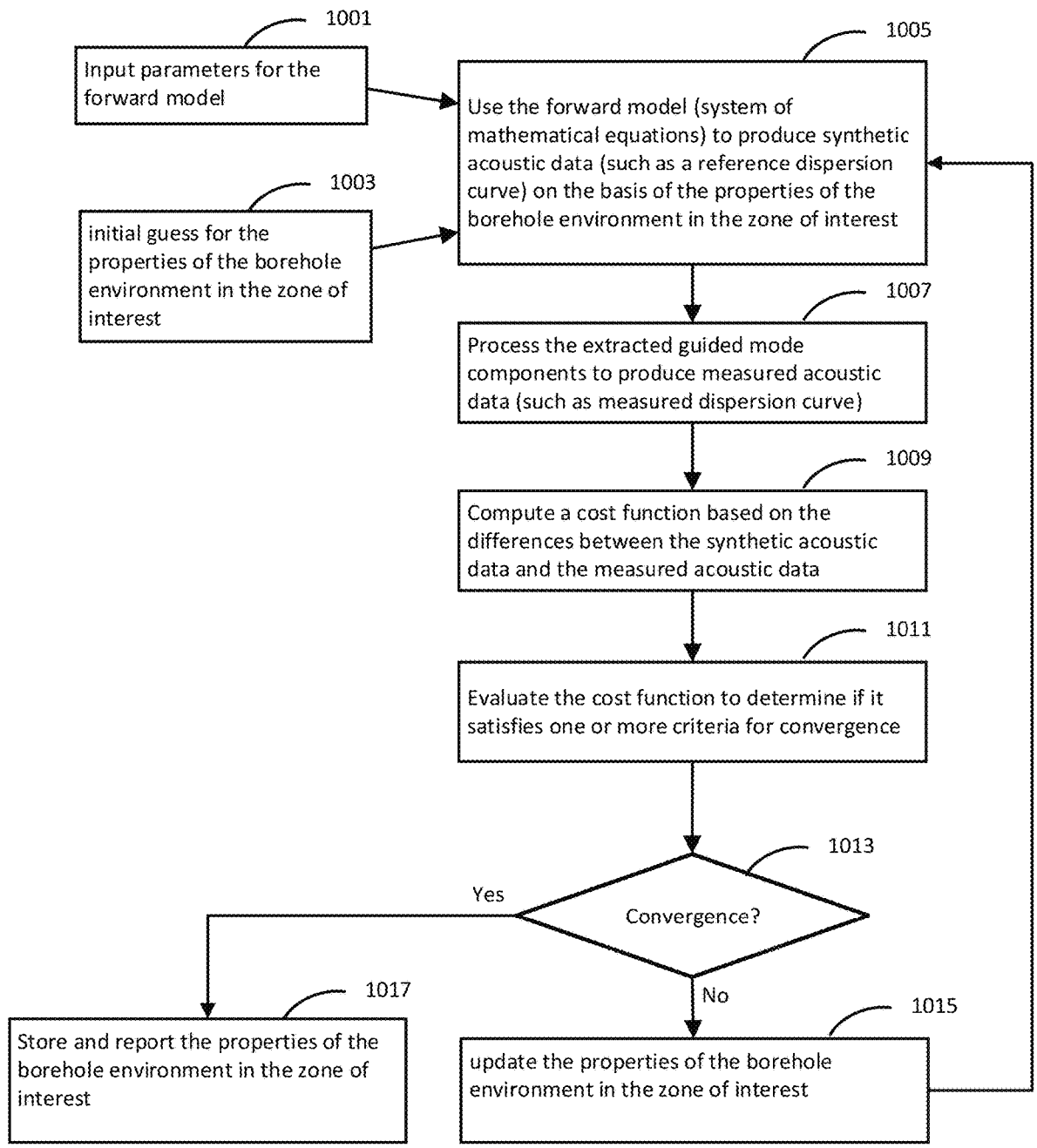
FIG. 10 is a flowchart of an exemplary inversion that can be used to infer properties of a zone of interest in the borehole environment of a well that is interrogated by a focused acoustic beam emitted from an acoustic logging tool as described herein.

FIG. 10 is a flowchart of exemplary inversion operations that can used to infer properties of a zone of interest in the borehole environment of a well that is interrogated by a focused acoustic beam emitted from an acoustic logging tool as described herein.

In block 1001, parameters for a forward model are input.
In block 1003, an initial guess is made for one or more properties of the borehole environment in the zone of interest.
In block 1005, the forward model (e.g., a system of mathematical equations) is used to produce synthetic acoustic data (such as a reference dispersion curve) on the basis of the properties of the borehole environment in the zone of interest.

In block 1007, the extracted guided mode components (block 903) can be processed to produce measured acoustic data (such as measured dispersion curve).

In block 1009, a cost function is computed based on the differences between the synthetic acoustic data of block 1005 and the measured acoustic data of block 1007.

In block 1011, the cost function is evaluated to determine if it satisfies one or more criteria for convergence.

In block 1013, the operations determine if the cost function satisfies the one or more criteria for convergence. If not, the operations continue to block 1015. If so, the operations, continue to block 1017.

In block 1015, one or more properties of the borehole environment in the zone of interest can be updated and the operations return to block 1005 for another iteration of the inversion processing.

In block 1017, the properties of the borehole environment in the zone of interest that are solved by the inversion processing can be stored and/or reported, for example, by storing and outputting the properties of the borehole environment in the zone of interest as part of a log that is displayed on a graphical user interface. Such inversion processing can be useful for characterizing properties of the rock formation (such as characteristics of near-wellbore stresses) at different zones of interest (at varying azimuthal and axial positions) in an open-hole environment or cement properties (such as fast and shear velocities) in different zones of interest (at varying azimuthal and axial positions) in a cased-hole environment.

Figure 11:
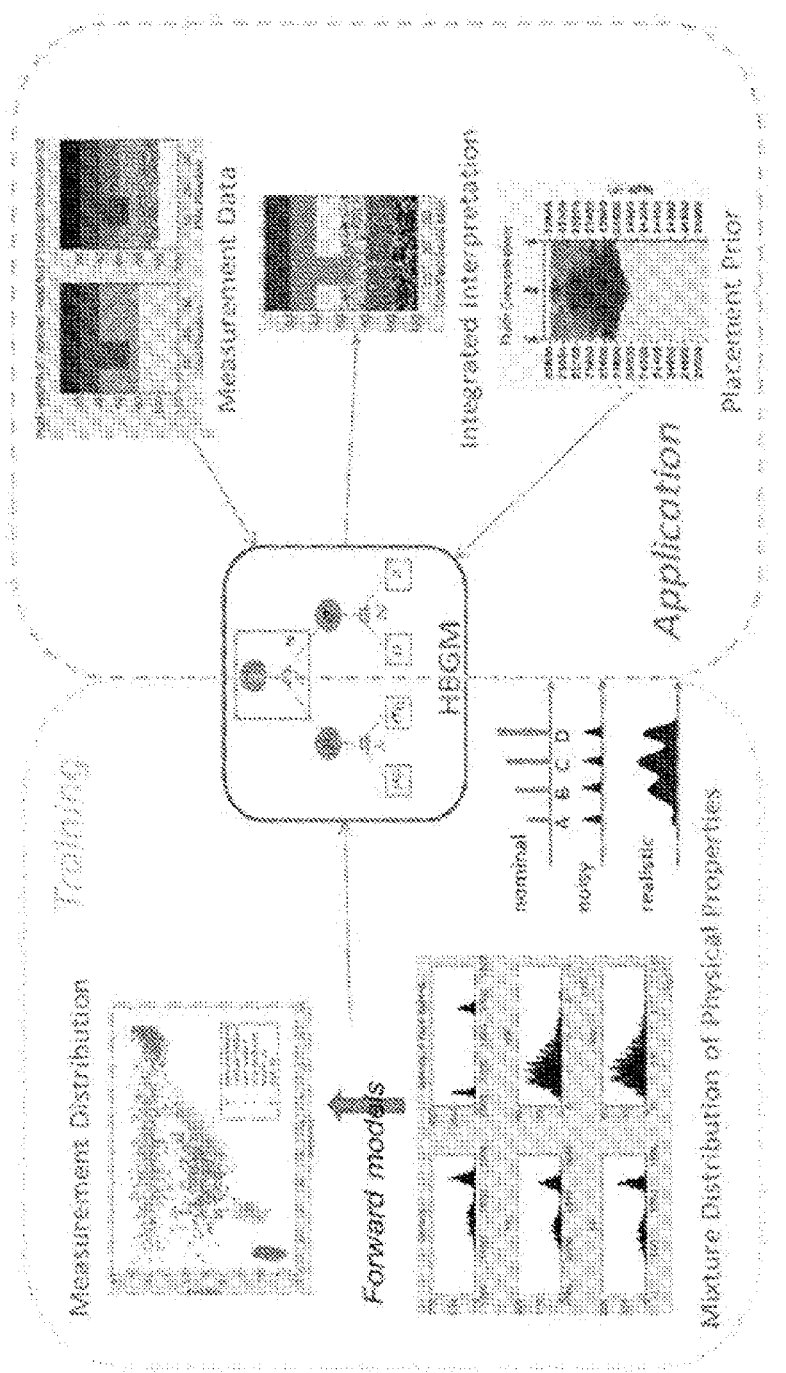
FIG. 11 is a schematic illustration of an exemplary machine-learning algorithm that can used to infer properties of a zone of interest in the borehole environment of a well that is interrogated by a focused acoustic beam emitted from an acoustic logging tool as described herein.

FIG. 11 is a schematic illustration of an exemplary machine-learning algorithm that can used to infer properties of a zone of interest in the borehole environment of a well that is interrogated by a focused acoustic beam emitted from an acoustic logging tool as described herein. The machine-learning algorithm can be carried out by the processor 110 that is located at the surface or housed as part of the downhole tool or other tool. For example, the machine learning algorithm can be used to interpret properties (such as the fill state and bond state) of cement that surrounds the casing over the range of azimuth directions θ and axial depths z of the cased well. For this purpose, the acoustic waveforms sensed by the receiver array(s) of the acoustic logging tool can be acquired and processed to extract the guided mode signal components that result from the focused acoustic beam at a given zone of interest (which is referenced by a particular azimuth direction θ, radial depth ρ, and axial depth z). Such guided mode signal components can be processed to obtain modal phase slowness and attenuation dispersion curves for the given zone of interest. Features sensitive to the cement properties (such as the fill state and bond state) in the given zone of interest can be constructed from the modal phase slowness and attenuation dispersion curves for the given zone of interest. Such features can be derived from synthetic acoustic data and can be used to train the machine learning classifier in a supervised fashion such that the trained machine learning classifier outputs classes that correspond to such features, where the classes pertain to cement properties (such as the fill state and bond state) for a variety of formations. These classes can be used to characterize and diagnosis the condition of the placed cement in a cased well. The trained machine learning classifier can also be used in an unsupervised fashion with features derived from the focused acoustic beam measurements of the acoustic logging tool. The trained machine learning processing can be applied over different zones of interest (with varying azimuth directions θ and axial positions z) investigated by the acoustic logging tool where the classes output by the trained machine learning classifier can be used to characterize and diagnosis the condition of the placed cement in the cased well.

In embodiments, the receiver elements of the receiver array 130 can be individually controllable in terms of an amplification factor and time delay applied to acoustic waveforms that are detected by the receiver element. The control of time delay allows for control of variable time delay between the acoustic waveforms that are detected by the receiver elements of the receiver array and thus the phase of the acoustic waveforms that are detected by the receiver elements of the receiver array. Specific amplification controls (or factors or weights) and time delays can be dynamically applied to the receiver elements of the receiver array. By properly adjusting the amplification controls and time delays for the receiver elements of the receiver array and combining the resulting signals, the sensitivity of the receiver elements can be steered and focused to probe a desired zone in the borehole environment. Such control can be configured for deep probing with high azimuthal resolution by the steering and focusing of the sensitivity of the receiver elements of the receiver array azimuthally, axially, and radially.

In such embodiments, the transmitter elements of the transmitter array 120 of the tool can be configured to emit a focused acoustic beam in the same (or overlapping) zone in the borehole environment that is probed by the steered and focused sensitivity of the receiver elements of the receiver array.

However, such beam focusing operations by the transmitter elements are not required and another transmitter configuration (such as a monopole source, dipole source or quadropole source) can be incorporated and used by the acoustic logging tool provided that such transmitter configuration produces the desired borehole guided acoustic mode signal that reaches and interacts with the desired zone in the borehole environment that is probed by the steered and focused sensitivity of the receiver elements of the receiver array.

In embodiments, the experiment employing the steered and focused sensitivity of the receiver elements of the receiver array 130 can be repeated with different time delays and amplification controls applied to the receiver elements of the receiver array 130 to scan the sensitivity of the receiver elements through an area of interest in the borehole environment. By properly adjusting the time delays and amplification controls among the receiver elements of the receiver array and combining the resulting signals, the sensitivity of the receiver elements of the receiver array can be steered and focused dynamically without requiring mechanical scanning (rotation) of the acoustic logging tool.

In order to steer and focus the sensitivity of the receiver elements of the receiver array, Eqn. (5) and the related calculations as described above can be used to derive a model (e.g., system of equations) that relates azimuthal direction θ and axial propagation distance z specified as inputs to amplification factors and time delays for the receiver elements of the receiving array 130 that will focus the sensitivity of the receiving array 130 to a zone in the borehole environment that corresponds to the azimuthal direction θ and axial propagation distance z. Thus, an azimuthal direction θ and axial propagation distance z can be specified as inputs to this model, and the model can be solved to determine amplification factors and time delays for the receiver elements of the receiving array 130 that will focus the sensitivity of the receiving array 130 at the zone in the borehole environment that corresponds to the azimuthal direction θ and axial propagation distance z.

In other embodiments, this model can be embodied by other representations (such as a table, array or list) that relates azimuthal direction θ and axial propagation distance z specified as inputs to amplification factors and time delays for the receiver elements of the receiving array 130 that will focus the sensitivity of the receiving array 130 at the zone in the borehole environment that corresponds to the azimuthal direction θ and axial propagation distance z.

Figure 12B:
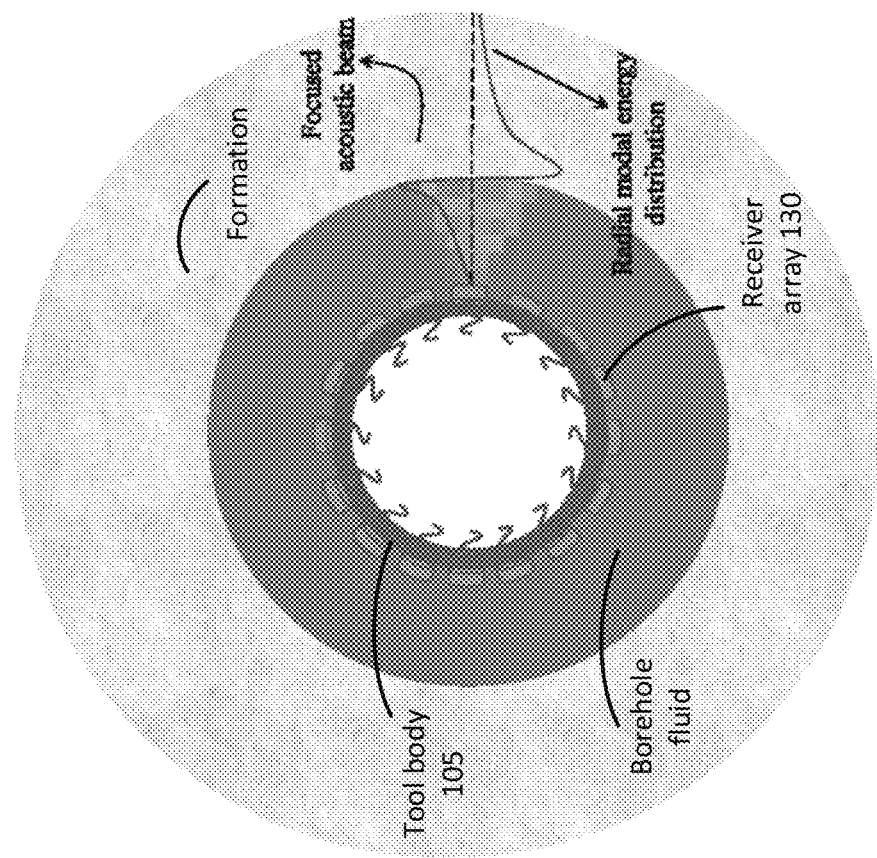
FIGS. 12A and 12B show interrogation by a focused acoustic beam emitted from an acoustic logging tool as described herein for 3D scanning of formation properties in an open hole environment.
Figure 12A:
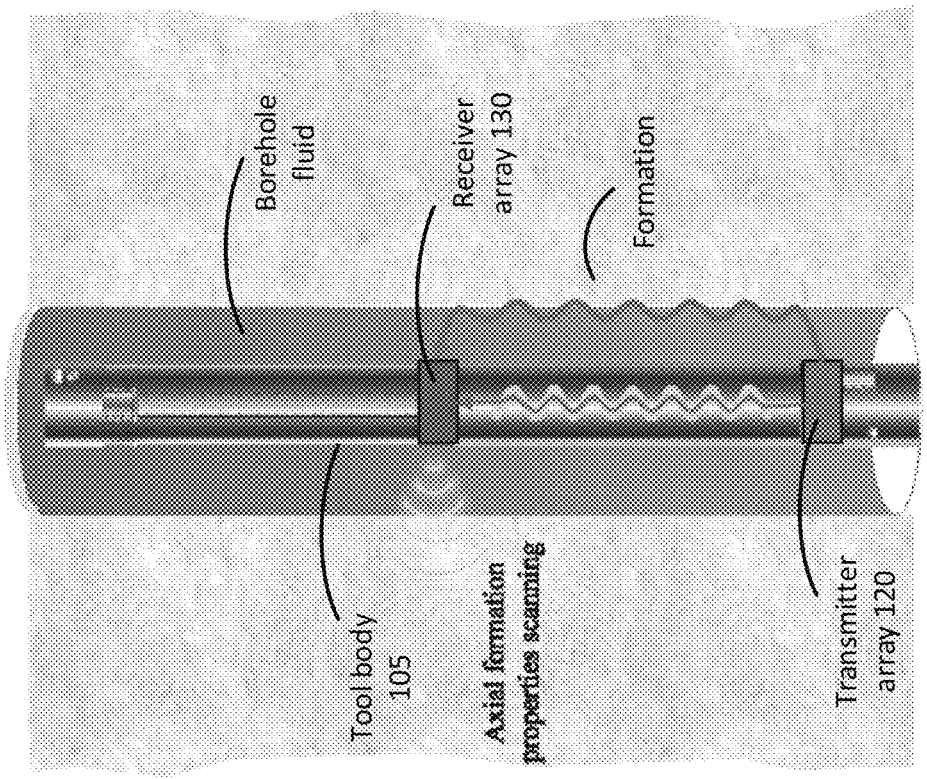

FIGS. 12A and 12B show applications of the systems and method described herein that employ transmitter array beam steering and focusing and/or receiver array steering and focusing to probe a rock formation adjacent the tool in an open wellbore geometry for open-hole evaluation. The radial modal energy distribution is dependent on the modal shape of the borehole guided mode waves. Note that the borehole guided mode waves transmitted by the transmitter array (or other transmitter configuration of the tool) can be selected to have large energy concentration at particular radial depth range such that the measurements of the tool are sensitive to formation properties at this particular radial depth. The systems and method described herein can also been used for dipole and quadrupole azimuthal steering for open-hole evaluation.

Figure 13B:
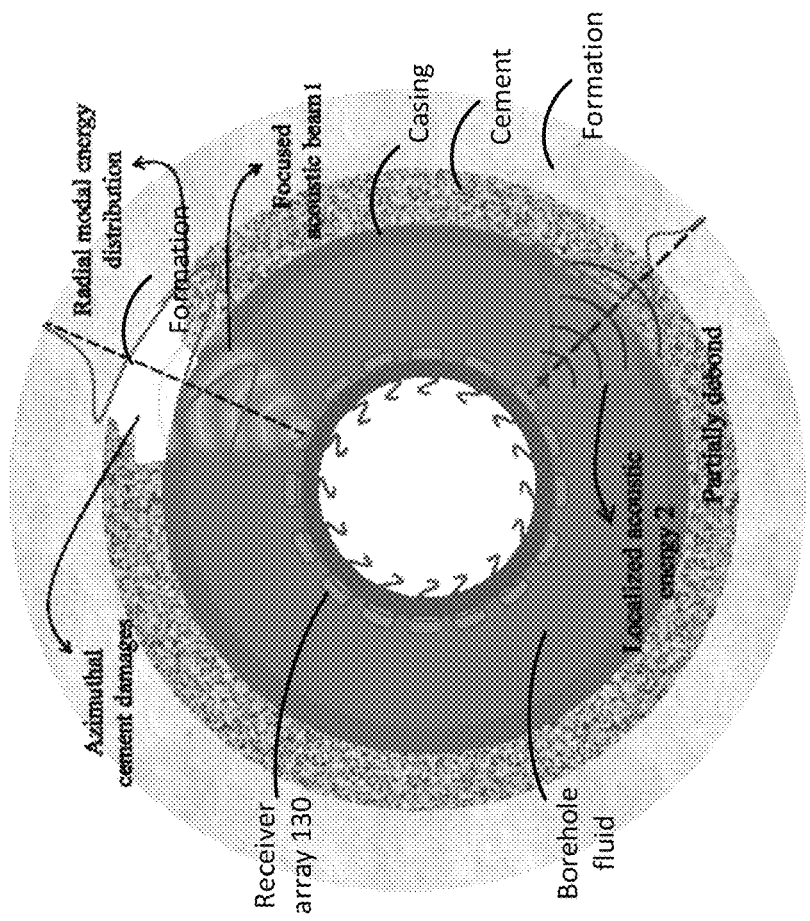
FIGS. 13A and 13B show interrogation by a focused acoustic beam emitted from an acoustic logging tool as described herein for 3D scanning of azimuthal cement damage in a cased-hole environment.
Figure 13A:
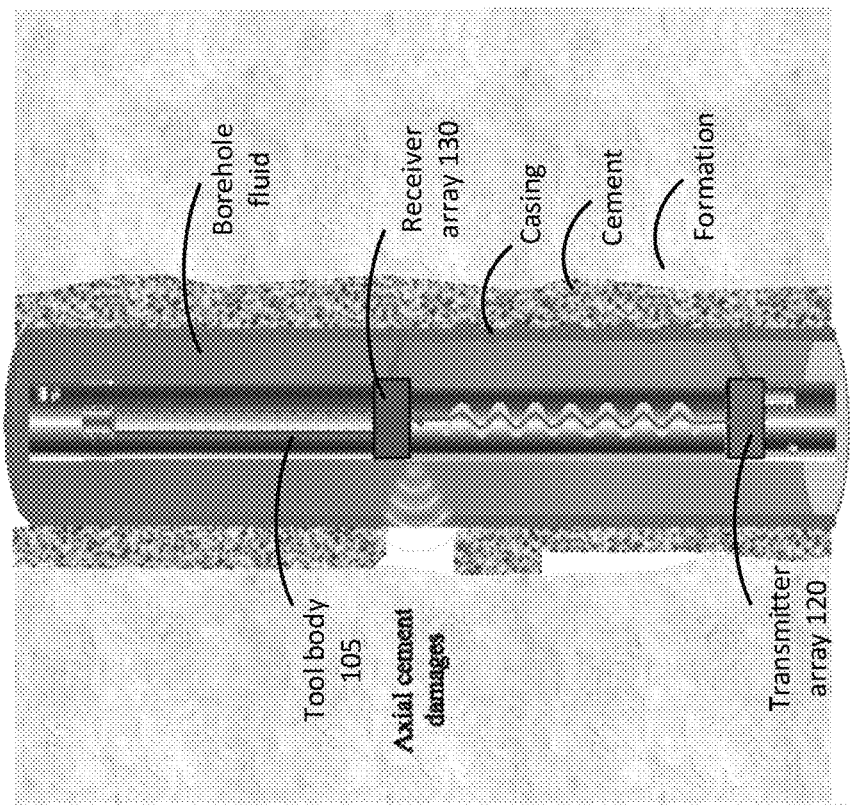

FIGS. 13A and 13B show applications of the systems and method described herein that employ transmitter array beam steering and focusing and/or receiver array steering and focusing to probe cement adjacent the tool in a cased wellbore geometry for cased-hole evaluation. The radial modal energy distribution is dependent on the modal shape of the borehole guided mode waves. Note that the borehole guided mode waves transmitted by the transmitter array (or other transmitter configuration of the tool) can be selected to have large energy concentration at particular radial depth range (for example, at annulus B in the figure) such that the measurements of the tool are sensitive to the casing/cement properties at this particular radial depth. These measurements can be used for the following:

Localized azimuthal probing within the cement sheath for fluid channel, cracking, and damage imaging in a cased-hole with a single casing string.

Localized azimuthal probing of the cement-casing bond characterization in a cased-hole with a single casing string.

Localized azimuthal probing of the cement-formation bond characterization in a cased-hole with a single casing string.

Localized azimuthal probing within the cement sheath of the inner annulus A or the outer annulus B for fluid channel, cracking, and damage imaging in a cased-hole with a double casing string.

Localized azimuthal probing of the cement-casing bond characterization of the inner annulus A or the outer annulus B in a cased hole with a double casing string.

Localized azimuthal probing of the cement-formation bond characterization in outer annulus B in a cased-hole with a double casing string.

The methods described herein for transmitter array beam steering and focusing and/or receiver array steering and focusing can be performed at least partially by a processing system. For example, processes, such as (i) determining a plurality of modes using acoustic data, (ii) identifying a mode-of-interest from a plurality of modes, (ii) determining a set of parameters that can be used to optimize a measurement of the well zone using a mode-of-interest, (iv) determining a plurality of modes using modeling of the wellzone; (v) processing data derived from detected acoustic waveforms, and vi) determining at least one property of a zone-of-interest using such data, can be performed using a processing system.

Some of the methods and processes described above can be performed by a processor. The term "processor" should not be construed to limit the embodiments disclosed herein to any particular device type or system. The processor may include a computer system. The computer system may also include a computer processor (e.g., a microprocessor, microcontroller, digital signal processor, or general purpose computer) for executing any of the methods and processes described above.

The computer system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

Some of the methods and processes described above, as listed above, can be implemented as computer program logic for use with the computer processor. The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Alternatively or additionally, the processor may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

Although several example embodiments have been described in detail above, those skilled in the art will readily appreciate that many modifications are possible in the example embodiments without materially departing from the scope of this disclosure. Accordingly, all such modifications are intended to be included within the scope of this disclosure.

REFERENCES

1. S. Zeroug, S. Bose, B. Sinha, M. Skataric, Y. Liu, and R. D'Angelo, "Sonic and ultrasonic measurement applications fort cased oil wells", Insight, vol. 58(8), pp. 423-430, August 2016 and in 19th World Conference on Non-Destructive Testing, June, 2016 in Munich, Germany
2. "Ultrasonic leaky-lamb wave imaging through a highly contrasting layer," S. Zeroug and B. Froelich, in 2003 IEEE Symposium on Ultrasonics, pages 794-798, Vol. 1. (2003)
3. "A Novel Ultrasonic Cased-Hole Imager for Enhanced Cement Evaluation," R. van Kuijk, SPE, S. Zeroug, B. Froelich, M. Allouche, S. Bose, D. Miller, J.-L. le Calvez, V. Schoepf, and A. Pagnin; International Petroleum Technology Conference (IPTC), 21-23 Sep. 2005, Doha, Qatar. (2005)
4. "Sonic Investigations In and Around the Borehole," Arroye, France et al.; Schlumberger Oilfield Review, pp. 14-33, (Spring 2006)
5. "Borehole Acoustic Waves," Haldorsen et al.; Schlumberger Oilfield Review, pp. 34-43, (Spring 2006)
6. B. K. Sinha and S. Asvadurov, "Dispersion and radial depth of investigation of borehole modes", Geophysical Prospecting, vol. 52, pp. 271-286, 2004.
7. Sinha, B. K., Lei, T. and Zeroug, S., "Sonic logging for well integrity," US patent application Publication No 2015/0198732.
8. Pistre, V., Kinoshita, T., Endo, T., Schilling, K., Pabon, J., Sinha, B., Plona, T., Ikegami, T., and Johnson, D., A modular wireline sonic tool for measurements of 3D formation acoustic properties, SPWLA 46$^{th}$ Annual Logging Symposium, New Orleans, June 2005.
9. "Theoretical and experimental investigations of acoustic waves in embedded fluid-solid multi-string structures", Y. Liu, R. M. D'Angelo, B. K. Sinha, and S. Zeroug, Appl. Phys. Lett., 110, 101906, (2017)

What is claimed is:

1. A downhole tool that uses acoustic energy to probe a wellbore traversing a subterranean formation, the downhole tool comprising:

at least one transmitter configured to emit borehole guided mode acoustic signals that propagate in the wellbore;

a receiver array comprising a plurality of receiver elements, wherein each receiver element of the receiver array is configured to detect acoustic waveforms that result from propagation of the acoustic borehole guided mode signals in the wellbore and apply variable amplification and a variable time delay to the detected acoustic waveforms, wherein the variable amplification is controlled by an amplification factor assigned to the given receiver element, and wherein the variable time delay is controlled by a time delay assigned to the given receiver element; and a controller that configures the at least one transmitter to emit the borehole guided mode acoustic signals that propagate in the wellbore and assigns a set of amplification factors and time delays to the receiver elements of the receiver array and combines signals resulting from the application of the variable amplification and the variable time delay to the detected acoustic waveforms such that sensitivity of the receiver elements of the receiver array is focused at a desired zone-of-interest in the wellbore corresponding to the set of amplification factors and time delays assigned to the receiver elements of the receiver array.

2. The downhole tool according to claim 1, wherein:

the set of amplification factors and time delays for the receiver elements of the receiver array are determined based upon a model that relates wellbore coordinates to amplification factors and time delays for the receiver elements of the receiver array that will focus the sensitivity of the receiver elements at different zones in the wellbore.

3. The downhole tool according to claim 2, wherein:

the model accounts for at least one borehole effect that influences propagation of the borehole guided mode acoustic signals in the wellbore.

4. The downhole tool according to claim 2, wherein:

the receiver elements of the receiver array are azimthully spaced about an outer circumference of the downhole tool in a ring-configuration.

5. The downhole tool according to claim 2, which is configured as a wireline tool.

6. A downhole acoustic logging system comprising:

the downhole tool of claim 2; and the controller of the downhole tool or another processor which is configured to determine at least one property of the zone-of-interest using the combined signals output from the receiver array.

* * * * *